United States Patent
Mizuno

(10) Patent No.: US 11,816,854 B2
(45) Date of Patent: Nov. 14, 2023

(54) IMAGE PROCESSING APPARATUS AND IMAGE PROCESSING METHOD

(71) Applicant: SONY GROUP CORPORATION, Tokyo (JP)

(72) Inventor: Hiroki Mizuno, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 81 days.

(21) Appl. No.: 17/598,540

(22) PCT Filed: Mar. 4, 2020

(86) PCT No.: PCT/JP2020/009154
§ 371 (c)(1),
(2) Date: Sep. 27, 2021

(87) PCT Pub. No.: WO2020/208976
PCT Pub. Date: Oct. 15, 2020

(65) Prior Publication Data
US 2022/0180545 A1 Jun. 9, 2022

(30) Foreign Application Priority Data
Apr. 8, 2019 (JP) .................................. 2019-073298

(51) Int. Cl.
*G06T 17/20* (2006.01)
*G06T 7/579* (2017.01)

(52) U.S. Cl.
CPC .............. *G06T 7/579* (2017.01); *G06T 17/20* (2013.01); *G06T 2207/10024* (2013.01); *G06T 2207/10028* (2013.01)

(58) Field of Classification Search
None
See application file for complete search history.

(56) References Cited

U.S. PATENT DOCUMENTS

| 9,959,671 B1* | 5/2018 | Carriere, IV | H04N 13/257 |
| 2009/0154794 A1* | 6/2009 | Kim | G06T 17/20 382/154 |

(Continued)

FOREIGN PATENT DOCUMENTS

| JP | 5906258 B2 | 4/2016 |
| JP | 2018-195241 A | 12/2018 |
| WO | 2018/216341 A1 | 11/2018 |

OTHER PUBLICATIONS

International Search Report and Written Opinion of PCT Application No. PCT/JP2020/009154, dated May 12, 2020, 08 pages of ISRWO.

(Continued)

*Primary Examiner* — Sultana M Zalalee
(74) *Attorney, Agent, or Firm* — CHIP LAW GROUP

(57) ABSTRACT

A three-dimensional shape of a subject is analyzed by inputting captured images of a depth camera and a visible light camera. There is provided an image processing unit configured to input captured images of the depth camera and the visible light camera, to analyze a three-dimensional shape of the subject. The image processing unit generates a depth map based TSDF space (TSDF Volume) by using a depth map acquired from a captured image of the depth camera, and generates a visible light image based TSDF space by using a captured image of the visible light camera. Moreover, an integrated TSDF space is generated by integration processing on the depth map based TSDF space and the visible light image based TSDF space, and three-dimensional shape analysis processing on the subject is executed using the integrated TSDF space.

15 Claims, 19 Drawing Sheets

(56) References Cited

U.S. PATENT DOCUMENTS

| | | | | |
|---|---|---|---|---|
| 2010/0194741 A1* | 8/2010 | Finocchio | ............... | G06T 7/269 345/419 |
| 2011/0007072 A1* | 1/2011 | Khan | ...................... | G06T 7/564 345/420 |
| 2011/0282473 A1* | 11/2011 | Pavlovskaia | ........... | G16H 50/50 700/98 |
| 2013/0258062 A1* | 10/2013 | Noh | ........................ | G06T 17/00 348/47 |
| 2016/0275686 A1* | 9/2016 | Zach | ...................... | G06V 20/64 |
| 2017/0228885 A1* | 8/2017 | Baumgartner | ....... | H04N 13/204 |

OTHER PUBLICATIONS

Su, et al., "A robust RGB-D SLAM system for 3D environment with planar surfaces", IEEE International Conference on Image Processing, 2013, pp. 275-279.

\* cited by examiner

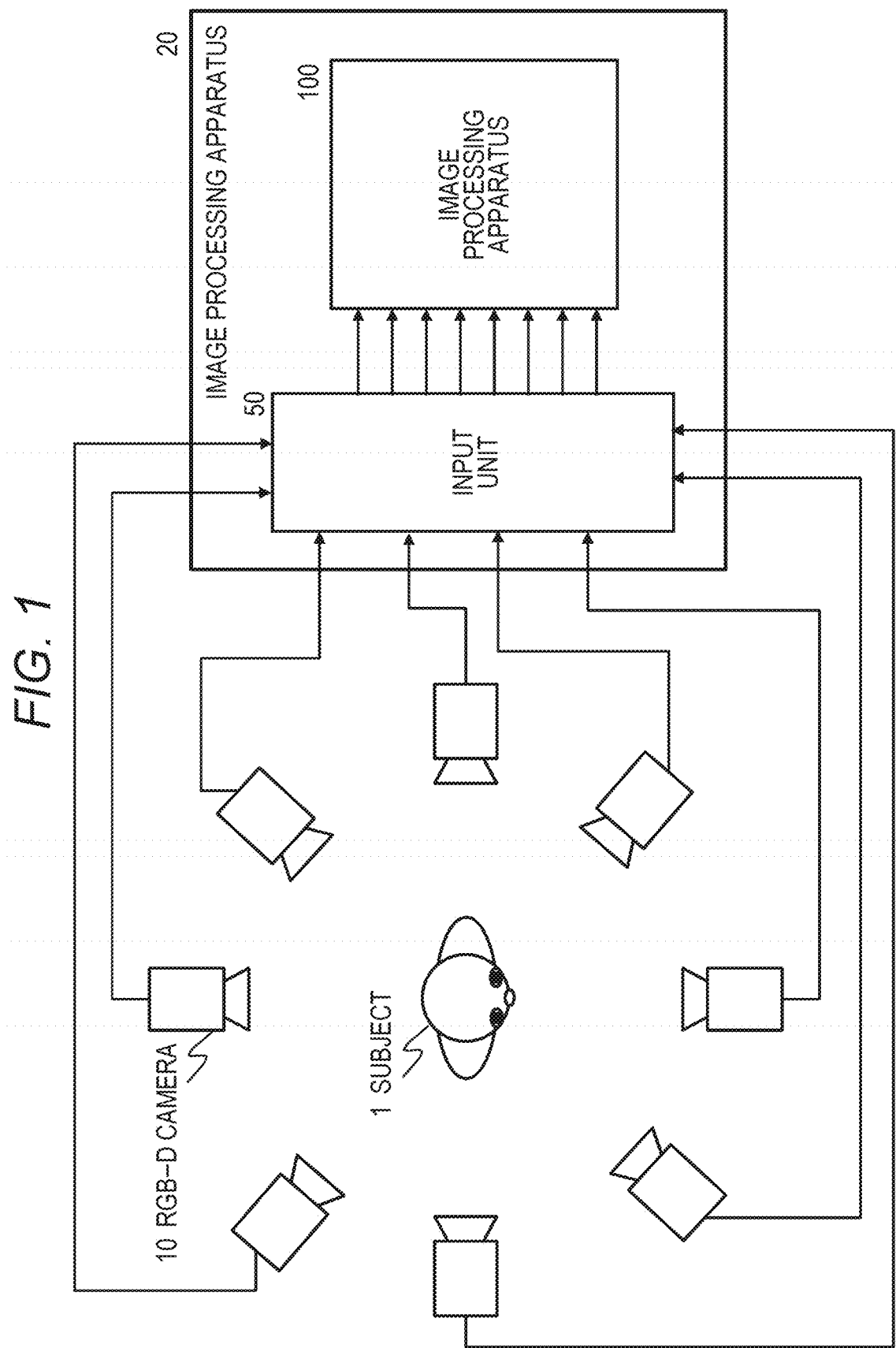

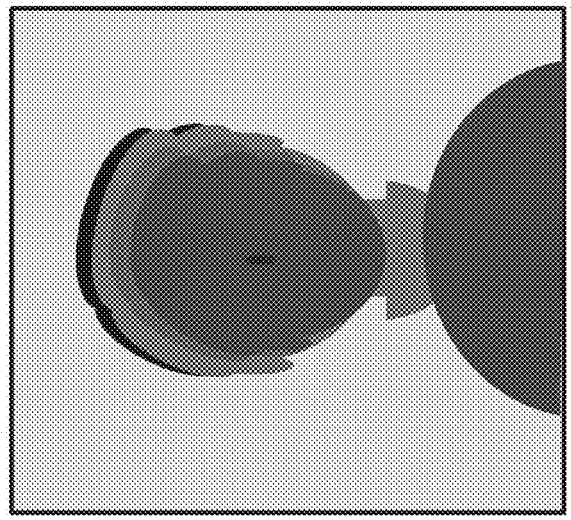
FIG. 2B DEPTH MAP
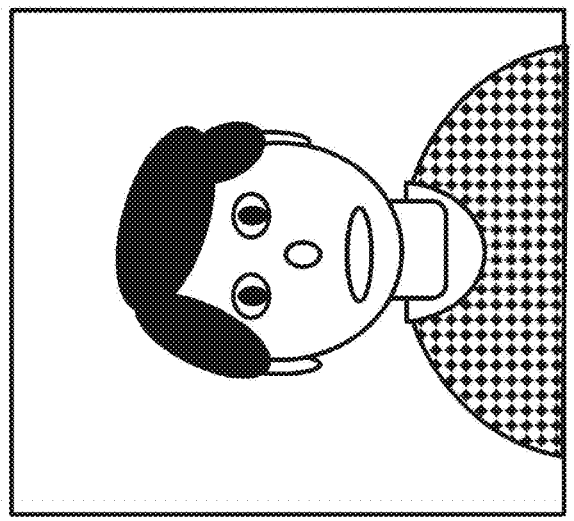
FIG. 2A RGB IMAGE

DEPTH MAP

RGB IMAGE

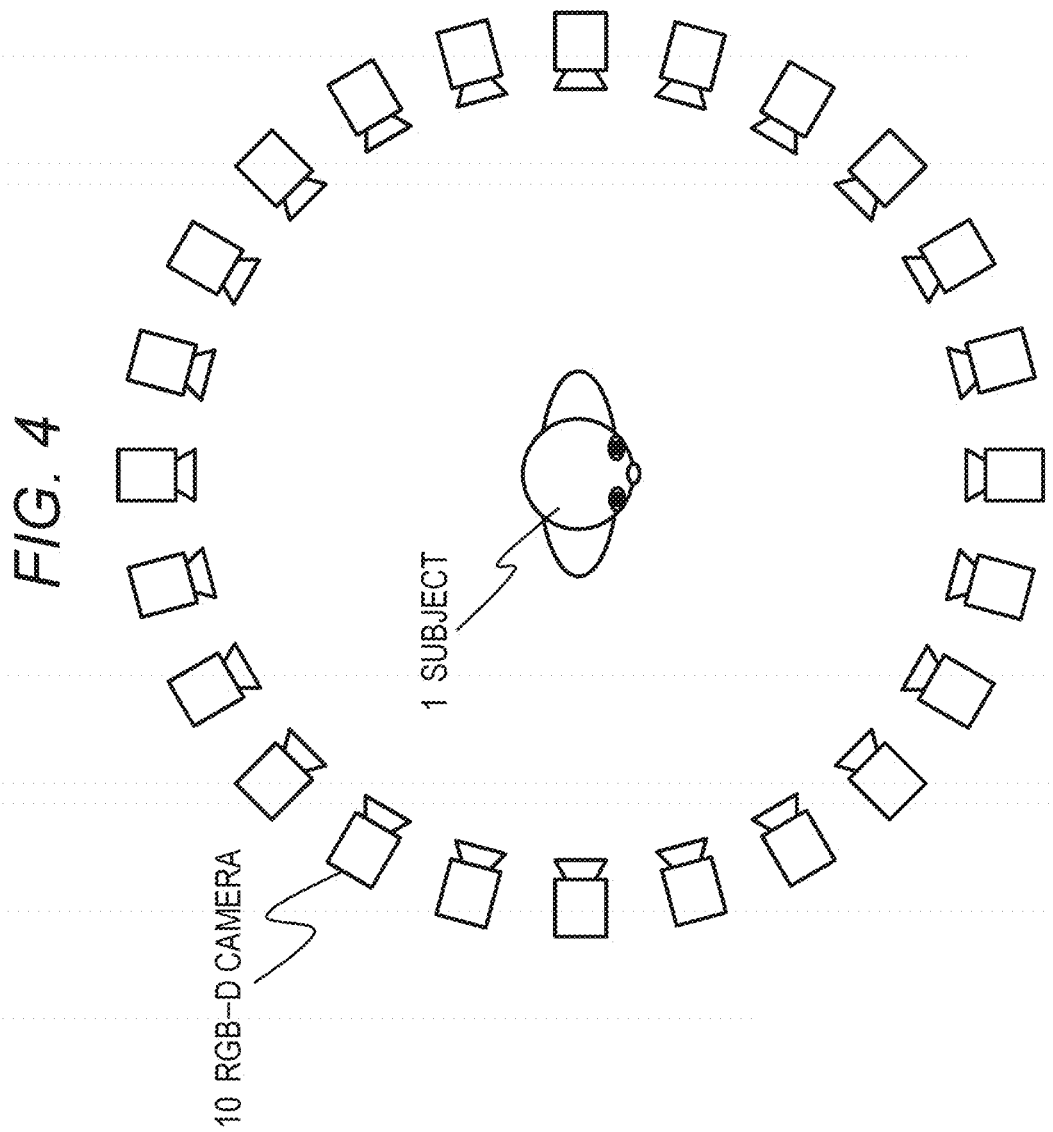

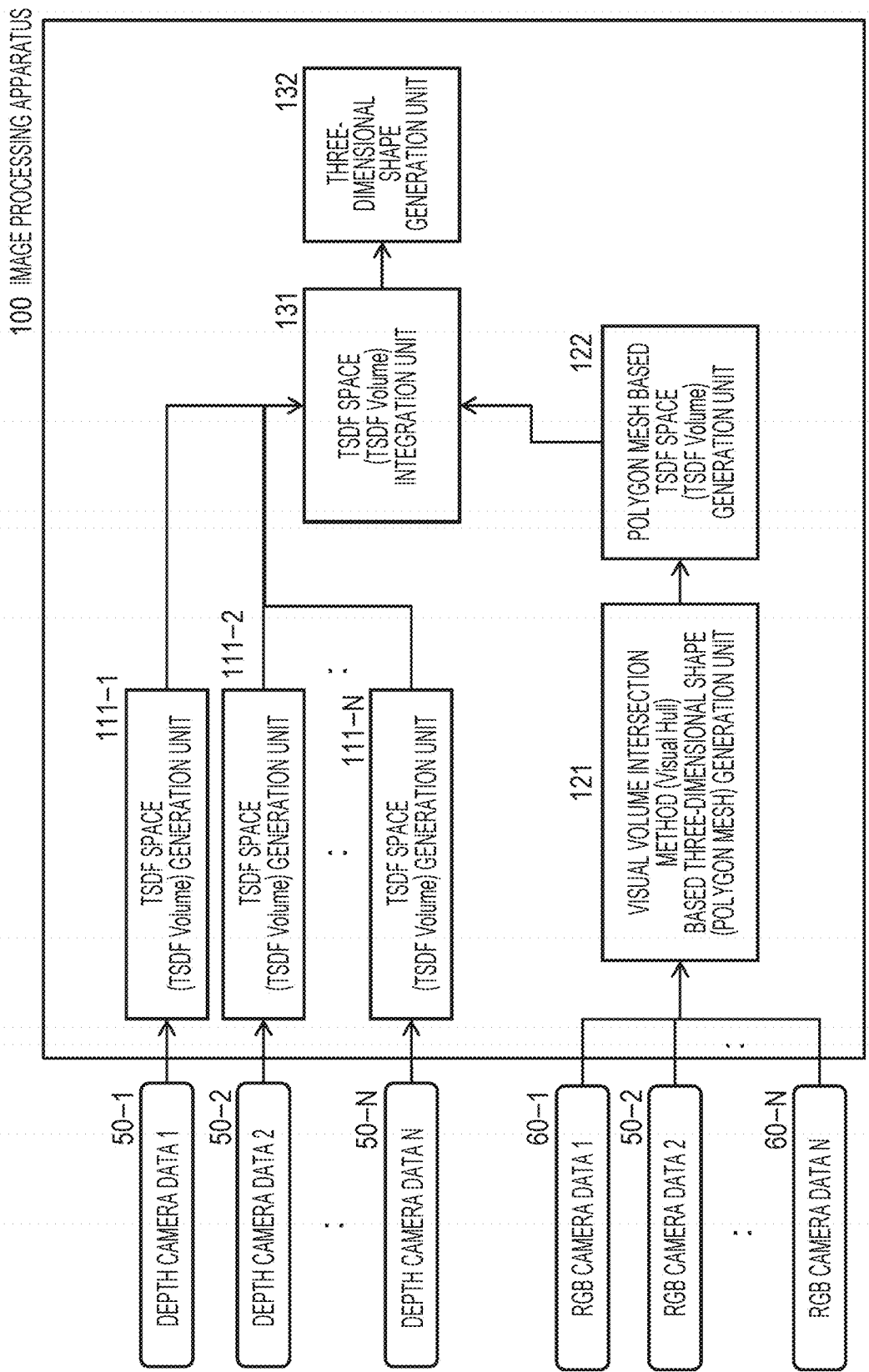

$\alpha = 1.0$

THREE-DIMENSIONAL IMAGE BY ONLY USING RGB IMAGE BASED TSDF $\alpha = 0.5$

THREE-DIMENSIONAL IMAGE GENERATED BY SYNTHESIZING BOTH DEPTH MAP BASED TSDF AND RGB IMAGE BASED TSDF WITH SYNTHESIS RATIO OF 1:1

$\alpha = 0.0$

THREE-DIMENSIONAL IMAGE GENERATED BY ONLY USING DEPTH MAP BASED TSDF

IMAGE PROCESSING APPARATUS AND IMAGE PROCESSING METHOD

CROSS REFERENCE TO RELATED APPLICATIONS

This application is a U.S. National Phase of International Patent Application No. PCT/JP2020/009154 filed on Mar. 4, 2020, which claims priority benefit of Japanese Patent Application No. JP 2019-073298 filed in the Japan Patent Office on Apr. 8, 2019. Each of the above-referenced applications is hereby incorporated herein by reference in its entirety.

TECHNICAL FIELD

The present disclosure relates to an image processing apparatus, an image processing method, and a program. More specifically, the present disclosure relates to an image processing apparatus, an image processing system, and a program that execute three-dimensional (3D) shape analysis processing.

BACKGROUND ART

In recent years, three-dimensional image generation technology using computer graphics (CG) technology has been used in various fields such as movies and games.

For example, Patent Document 1 (Japanese Patent No. 5906258) discloses a technique for reconfiguring a highly accurate three-dimensional shape of a subject by using a depth map generated from a captured image of a depth camera capable of measuring a distance (depth) from the camera. The reconfiguration processing of the three-dimensional shape by using the depth map is called Kinect Fusion.

In Kinect Fusion, by executing processing similar to simultaneous localization and mapping (SLAM) that sets a target of three-dimensional shape reconfiguration as a still scene and simultaneously generates self-location estimation and an environment map, map generation and self-location estimation by tracking are simultaneously performed. As a result, the three-dimensional shape of a subject is reconfigured with high quality and high accuracy.

In Kinect Fusion, as a map expressing a structure of a scene (subject), there is used a map that expresses the scene as a volume that is a stereoscopic space, and stores, with a sign, a distance from a depth value acquired by a depth camera in each voxel of a cube, which is a volume component. This map is referred to as a TSDF space (volumetric truncated signed distance function=TSDF Volume).

When a location and a position of the camera are known, a more accurate three-dimensional structure can be restored by taking a weighted average of individual voxels constituting the TSDF space (TSDF Volume) generated on the basis of depth information acquired from a plurality of viewpoints.

After the release of Kinect Fusion, several technologies to which Kinect Fusion is applied have been released. For example, a method of processing a large-scale space exceeding a memory capacity of a three-dimensional shape analysis device, a method of performing expansion on a dynamic subject, and the like are released, showing that a three-dimensional shape can be reconstructed with high quality.

Whereas, in all of these approaches, since the shape is restored only from the depth map obtained from the depth camera, there is a problem that it is difficult to perform reconfiguration for a material or the like for which it is difficult to acquire a depth.

Note that many depth cameras that are currently available at relatively low cost are cameras using a method called active sensing using infrared light (IR light). However, this depth camera using an infrared light (IR light) source has a problem that highly accurate depth measurement becomes difficult or depth can no longer be measured for a material having weak reflection for infrared light.

Examples of a material that absorbs infrared light (IR light) include a black material, particularly black hair of oriental people as a remarkable example. Therefore, for example, the depth measurement accuracy decreases in a black hair region, and the three-dimensional shape can no longer be calculated.

As described above, since the depth map is used as an input in the three-dimensional shape reconfiguration processing using the TSDF space (TSDF Volume), there is a problem that a correct three-dimensional shape cannot be estimated for a region where the depth cannot be accurately acquired.

CITATION LIST

Patent Document

Patent Document 1: Japanese Patent No. 5906258

SUMMARY OF THE INVENTION

Problems to be Solved by the Invention

The present disclosure has been made in view of the above-described problems, for example, and provides an image processing apparatus, an image processing method, and a program capable of analyzing a highly accurate three-dimensional shape even in a region where it is difficult to acquire an accurate depth by a depth camera.

Solutions to Problems

A first aspect of the present disclosure is an image processing apparatus having:
an image processing unit configured to input captured images of a depth camera and a visible light camera, to analyze a three-dimensional shape of a subject, in which
the image processing unit
generates a depth map based TSDF space (TSDF Volume) by using a depth map acquired from a captured image of the depth camera,
generates a visible light image based TSDF space by using a captured image of the visible light camera,
generates an integrated TSDF space by integration processing on the depth map based TSDF space and the visible light image based TSDF space, and
executes three-dimensional shape analysis processing on the subject by using the integrated TSDF space.

Moreover, a second aspect of the present disclosure is
an image processing method executed in an image processing apparatus, in which the image processing apparatus includes:
an image processing unit configured to input captured images of a depth camera and a visible light camera, to analyze a three-dimensional shape of a subject, and
the image processing unit
generates a depth map based TSDF space (TSDF Volume) by using a depth map acquired from a captured image of the depth camera,
generates a visible light image based TSDF space by using a captured image of the visible light camera,
generates an integrated TSDF space by integration processing on the depth map based TSDF space and the visible light image based TSDF space, and
executes three-dimensional shape analysis processing on the subject by using the integrated TSDF space.

Moreover, a third aspect of the present disclosure is
a program for causing an image processing apparatus to execute image processing, in which
the image processing apparatus includes:
an image processing unit configured to input captured images of a depth camera and a visible light camera, to analyze a three-dimensional shape of a subject, and
the program causes the image processing unit to execute:
a process of generating a depth map based TSDF space (TSDF Volume) by using a depth map acquired from a captured image of the depth camera;
a process of generating a visible light image based TSDF space by using a captured image of the visible light camera;
a process of generating an integrated TSDF space by integration processing on the depth map based TSDF space and the visible light image based TSDF space; and
a process of executing three-dimensional shape analysis processing on the subject by using the integrated TSDF space.

Note that the program of the present disclosure is, for example, a program that can be provided by a storage medium or a communication medium that provides a variety of program codes in a computer-readable format, to an image processing apparatus or a computer system capable of executing the program codes. By providing such a program in a computer-readable format, processing corresponding to the program is realized on the image processing apparatus or the computer system.

Still other objects, features, and advantages of the present disclosure will become apparent from the more detailed description based on the embodiment of the present disclosure as described later and the attached drawings. Note that a system in this specification is a logical set configuration of a plurality of devices, and is not limited to one in which a device of each configuration is in a same casing.

According to a configuration of an embodiment of the present disclosure, a configuration is realized in which captured images of a depth camera and a visible light camera are inputted, and a highly accurate three-dimensional shape of a subject is analyzed and restored.

Specifically, for example, there is provided an image processing unit that inputs captured images of the depth camera and the visible light camera to analyze a three-dimensional shape of a subject. The image processing unit generates a depth map based TSDF space (TSDF Volume) by using a depth map acquired from a captured image of the depth camera, and generates a visible light image based TSDF space by using a captured image of the visible light camera. Moreover, an integrated TSDF space is generated by integration processing on the depth map based TSDF space and the visible light image based TSDF space, and three-dimensional shape analysis processing on the subject is executed using the integrated TSDF space.

This configuration realizes a configuration in which captured images of the depth camera and the visible light camera are inputted and a highly accurate three-dimensional shape of a subject is analyzed and restored.

Note that the effects described in this specification are merely examples and are not limited, and additional effects may be present.

BRIEF DESCRIPTION OF DRAWINGS

FIG. 1 is a diagram for explaining a system configuration example applicable to three-dimensional shape analysis processing on a subject (scene) executed in an image processing apparatus of the present disclosure.

FIGS. 2A and 2B are views for explaining an example of an RGB image and a depth map.

FIG. 4 is a view for explaining a system configuration example in which a large number of cameras are arranged.

FIG. 5 is a diagram for explaining a specific configuration example of an image processing unit.

MODE FOR CARRYING OUT THE INVENTION

Figure 3B:
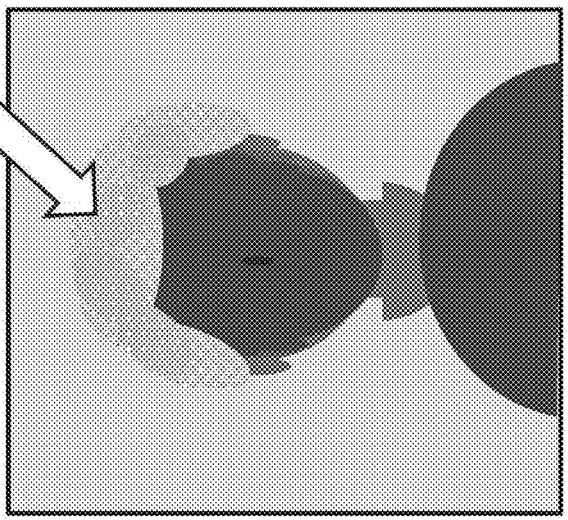
FIGS. 3A and 3B are views for explaining an example of an RGB image and a depth map.
Figure 3A:
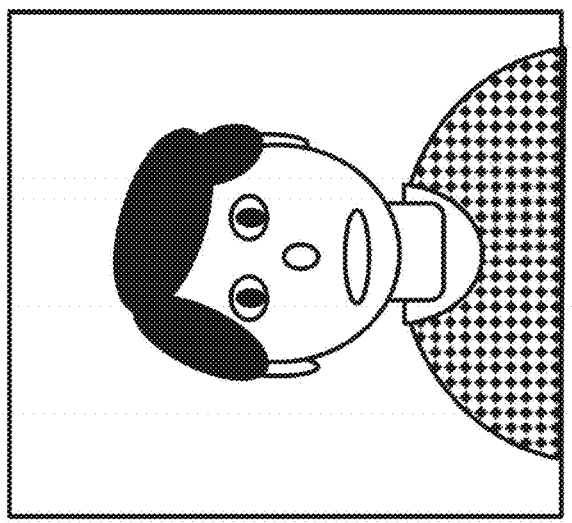

Hereinafter, with reference to the drawings, an image processing apparatus, an image processing method, and a program of the present disclosure will be described. Note that the description will be made in accordance with the following items.

1. About outline of processing executed by image processing apparatus of present disclosure
2. About configuration and processing of image processing unit
 2-1. About details of processing executed by TSDF space (TSDF Volume) generation unit
 2-2. About processing executed by visual volume intersection method (Visual Hull) based three-dimensional shape (polygon mesh) generation unit
 2-3. About processing executed by polygon mesh based TSDF space (TSDF Volume) generation unit
 2-4. About processing executed by TSDF space (TSDF Volume) integration unit
 2-5. About processing executed by three-dimensional shape generation unit
3. About processing sequence executed by image processing apparatus of present disclosure
4. About specific example of three-dimensional structure data of subject obtained by applying processing of present disclosure
5. About other embodiments
6. About hardware configuration example of image processing apparatus
7. Summary of configuration of present disclosure 1. About Configuration of Image Processing Apparatus of Present Disclosure and Processing to be Executed A configuration of an image processing apparatus of the present disclosure and processing to be executed will be described with reference to FIG. 1 and subsequent drawings.

The image processing apparatus according to the present disclosure is an apparatus capable of analyzing a highly accurate three-dimensional shape even in a region where a depth cannot be acquired by a depth camera, by using captured images of a depth camera and an RGB camera that capture images of a subject (scene) as an analysis target of the three-dimensional shape.

Specifically, the following processes are executed.

(Process 1) A "truncated signed distance function space"=TSDF space (volumetric truncated signed distance function=TSDF Volume) is generated, from a depth map of a subject (scene) acquired by a depth camera.

(Process 2) Images of the same subject (scene) are captured by RGB cameras from a plurality of different viewpoints, and silhouettes (RGB images) of the subject (scene) from the plurality of different viewpoints are acquired.

Note that Process 1 and Process 2 can be executed simultaneously.

(Process 3) A subject three-dimensional shape (polygon mesh) is generated by a visual volume intersection method (Visual Hull) that detects and executes an intersection region (And region) of the silhouettes of the subject (scene) captured from the plurality of different viewpoints by the plurality of RGB cameras.

Note that the visual volume intersection method (Visual Hull) will be described later in detail.

(Process 4) A TSDF space (TSDF Volume) is generated on the basis of the subject three-dimensional shape (polygon mesh) generated by the visual volume intersection method (Visual Hull) in the (Process 3) described above.

(Process 5) The TSDF space (TSDF Volume) based on the subject three-dimensional shape (polygon mesh) generated in the (Process 4) described above by the visual volume intersection method (Visual Hull) and the TSDF space (TSDF Volume) acquired from the depth map in the (Process 1) described above are integrated to reconfigure the three-dimensional shape of the entire subject (scene).

These processes enable a three-dimensional structure of a subject region that cannot be acquired from the TSDF space (TSDF Volume) acquired from the depth map in (Process 1) or that has low accuracy, to be complemented with the TSDF space (TSDF Volume) calculated in (Process 4) and generated from the subject three-dimensional shape (polygon mesh) generated by the visual volume intersection method (Visual Hull) based on the RGB image, which makes it possible to reconfigure the three-dimensional shape of the entire subject (scene) with high accuracy.

A specific configuration and processing of the image processing apparatus of the present disclosure will be described with reference to FIG. 1 and subsequent drawings.

FIG. 1 is a diagram for explaining a system configuration example applicable to three-dimensional shape analysis processing on a subject (scene) executed in an image processing apparatus 100 of the present disclosure.

In FIG. 1, a target of the three-dimensional shape analysis processing is a subject 1. Around the subject 1, a plurality of RGB-D cameras 10 that captures images of the subject from different viewpoint locations is arranged.

The RGB-D camera 10 is a camera capable of simultaneously capturing a depth map (depth image (=distance image)) and an RGB image.

For example, as illustrated in FIGS. 2A and 2B, the following two pieces of image data can be simultaneously captured.

FIG. 2A RGB image
FIG. 2B Depth map (depth image (=distance image))

The RGB image is a color image that can be captured by a normal camera.

The depth map is an image in which a density value corresponding to a distance from the camera is set for each pixel.

Note that many depth cameras measure a distance by detecting reflected light from a subject by using infrared light (IR light). For example, a depth camera of a time of flight (ToF) system uses a time during which infrared light reciprocates between the camera and the subject, and a depth camera of a structured light system measures a distance by observing a pattern of emitted infrared light with the camera.

However, as described above, there is a problem that highly accurate depth measurement becomes difficult or depth can no longer be measured for a material that absorbs infrared light (IR light), that is, a material that has weak reflection for infrared light.

Examples of a material that absorbs infrared light (IR light) include a black material, particularly black hair of oriental people. That is, for example, the depth measurement accuracy by the depth camera decreases for a black hair region.

Therefore, as illustrated in FIG. 3B, in a depth map actually captured by the RGB-D camera 10 illustrated in FIG. 1, a pixel value corresponding to a depth (distance) of a partial region such as a person's black hair is set to an incorrect value, that is, depth information with low accuracy. Even if such depth information with low accuracy is used, a highly accurate three-dimensional shape cannot be restored.

The image processing apparatus of the present disclosure restores a three-dimensional shape by using an image captured by the RGB camera for such a region.

Note that, in the example illustrated in FIG. 1, an example is illustrated in which a camera capable of simultaneously capturing a depth map and an RGB image is used as a camera that captures an image of the subject 1, but a configuration may be adopted in which the depth camera and the RGB camera are separately prepared, and each camera is arranged around the subject.

Note that, in the present embodiment, an example of capturing a visible-light color image of a subject by using the RGB camera will be described, but a monochrome camera may be used instead of the RGB camera. Various visible light cameras that capture images with normal visible light can be used.

Furthermore, the camera arrangement illustrated in FIG. 1 is an example, and the number of cameras may be further increased.

For example, as illustrated in FIG. 4, a configuration may be adopted in which a large number of cameras are arranged.

Moreover, a camera may be arranged so as to capture an image from above or an image from below with respect to the subject 1.

As illustrated in FIG. 1, the image processing apparatus 20 includes an input unit 50 and an image processing unit 100.

The input unit 50 inputs an RGB image that is a captured image, a depth map (depth image (=distance image)), and internal parameters and external parameters of the camera from each of the RGB-D cameras 10.

The internal parameter is, for example, data such as a focal length and an optical center of the camera, and the external parameter is a parameter such as a location and an image-capturing direction of the camera.

Specifically, the internal parameter and the external parameter are parameters required for TSDF space (TSDF Volume) generation processing and calculation processing of a subject three-dimensional shape based on the visual volume intersection method (Visual Hull).

These parameters are set as attribute information of a captured image of each camera, and are inputted to the image processing apparatus 20 together with the image.

The input unit 50 of the image processing apparatus 20 outputs, to the image processing unit 100, the RGB image, the depth map, the internal parameter, and the external parameter inputted from each of the RGB-D cameras 10.

The image processing unit 100 uses these pieces of input data to analyze the three-dimensional shape of the subject.

Hereinafter, a specific configuration of the image processing unit 100 and processing to be executed will be described with reference to FIG. 5.

2. About Configuration and Processing of Image Processing Unit

FIG. 5 is a diagram illustrating a specific configuration example of the image processing unit 100.

As illustrated in FIG. 5, the image processing unit 100 has: a plurality of TSDF space (TSDF Volume) generation units 111-1 to N; a visual volume intersection method (Visual Hull) based three-dimensional shape (polygon mesh) generation unit 121; a polygon mesh based TSDF space (TSDF Volume) generation unit 122; a TSDF space (TSDF Volume) integration unit 131; and a three-dimensional shape generation unit 132.

As illustrated in FIG. 5, to the image processing unit 100, input data from each camera arranged around the subject is inputted via the input unit 50.

The input data is depth camera data 1 to N and 50-1 to N and RGB camera data 1 to N and 60-1 to N illustrated in FIG. 5.

These pieces of input data are input data from individual cameras arranged around the subject.

A specific example of this input data will be described with reference to FIG. 6.

Figure 6:
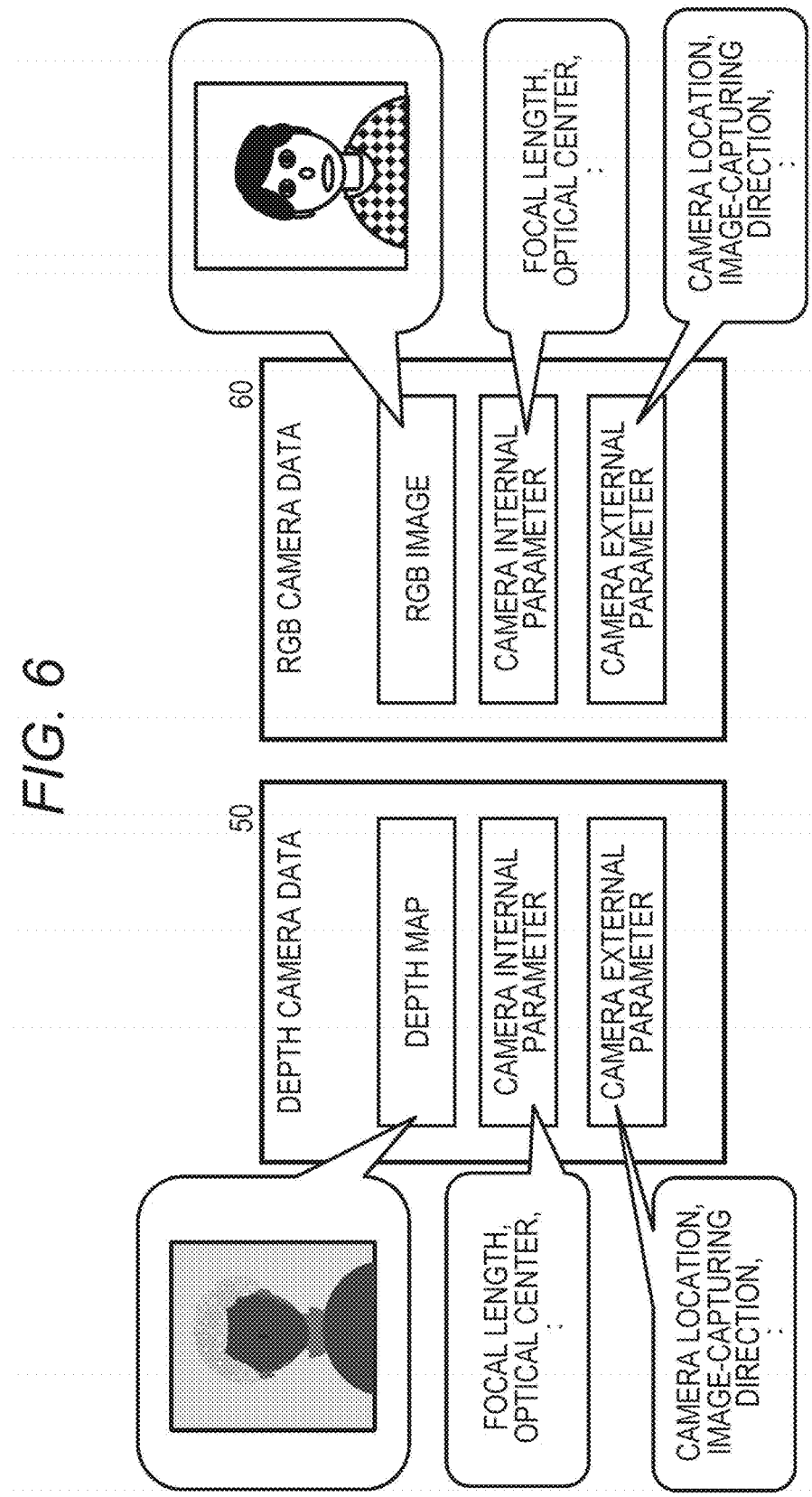
FIG. 6 is a diagram for explaining a specific example of data inputted from each camera to the image processing unit.

As illustrated in FIG. 6, in depth camera data 50,
(a) a depth map,
(b) camera internal parameters, and
(c) camera external parameters,
these pieces of data are included.

The (a) depth map is the depth map described above with reference to FIGS. 2A and 2B, and is an image in which a density value corresponding to a distance from the camera is set to each pixel.

The (b) camera internal parameters are parameters required for the TSDF space (TSDF Volume) generation processing based on the depth map, and are, for example, camera internal parameters such as a focal length and an optical center of the camera.

The (c) camera external parameters are also parameters required for the TSDF space (TSDF Volume) generation processing based on the depth map, and are, for example, camera external parameters such as location information and image-capturing direction information of the camera.

Note that parameters such as a location and a position of each camera can be acquired by calibration in advance.

Furthermore, as illustrated in FIG. 6, in RGB image camera data 60,
(a) an RGB image,
(b) camera internal parameters, and
(c) camera external parameters,
these pieces of data are included.

The (a) RGB image is the RGB image described above with reference to FIGS. 2A and 2B, and is an RGB color image that can be captured by a normal camera.

The (b) camera internal parameters are parameters required for calculation processing of the subject three-dimensional shape based on the visual volume intersection method (Visual Hull) based on the RGB image, and are, for example, camera internal parameters such as a focal length and an optical center of the camera.

The (c) camera external parameters are also parameters required for calculation processing of the subject three-dimensional shape based on the visual volume intersection method (Visual Hull) based on the RGB image, and are, for example, camera external parameters such as location information and image-capturing direction information of the camera.

These depth camera data and RGB camera data are inputted from individual cameras around the subject.

2-1. About Details of Processing Executed by TSDF Space (TSDF Volume) Generation Unit Next, details of processing executed by the TSDF space (TSDF Volume) generation units 111-1 to N will be described.

The depth camera data 1 to N and 50-1 to N of the individual RGB-D cameras 10 illustrated in FIG. 1 are inputted to the individual TSDF space (TSDF Volume) generation units 111-1 to N as illustrated in FIG. 5.

Each of the TSDF space (TSDF Volume) generation units 111-1 to N inputs depth camera data of one RGB-D camera 10, and generates one "truncated signed distance function space"=TSDF space (TSDF Volume) based on the depth map acquired by one depth camera.

A processing sequence executed by each of the TSDF space (TSDF Volume) generation units 111-1 to N will be described with reference to the flowchart illustrated in FIG. 7.

Figure 7:
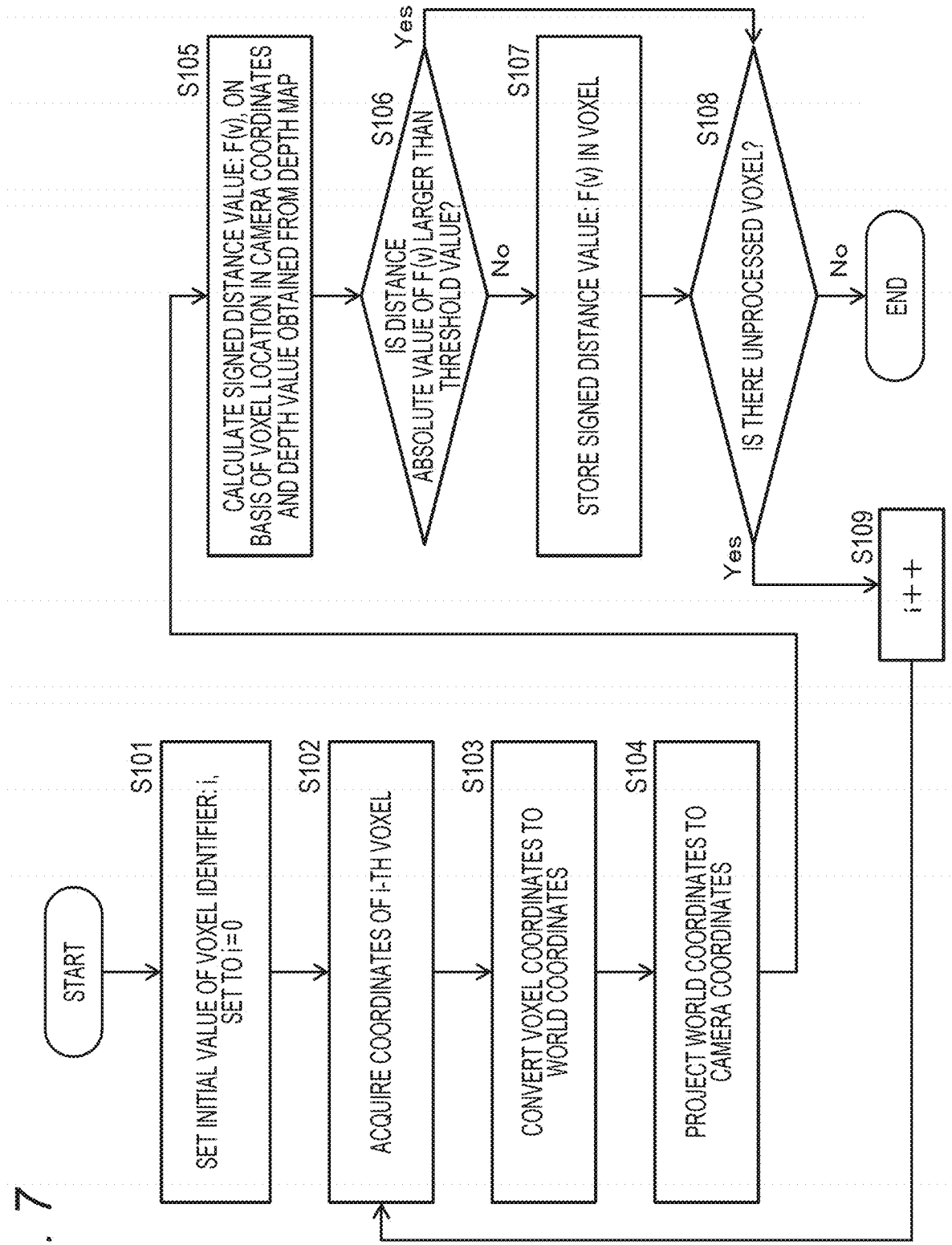
FIG. 7 is a view illustrating a flowchart for explaining a processing sequence executed by a TSDF space (TSDF Volume) generation unit.

Note that the processing according to the flow illustrated in FIG. 7 can be executed under control of a CPU or the like having a program execution function, in accordance with a program stored in a storage unit of the image processing apparatus 20, for example.

Processing of each step in the flow shown in FIG. 7 will be sequentially described.

Note that the processing of step S101 and subsequent steps of the flow illustrated in FIG. 7 is started by the one TSDF space (TSDF Volume) generation unit 111 inputting the depth camera data described above with reference to FIG. 6 from one depth camera.

That is, after the following pieces of the depth camera data are inputted, (a) a depth map,
(b) camera internal parameters, and
(c) camera external parameters, the processing is executed.

(Step S101)

First, in step S101, the TSDF space (TSDF Volume) generation unit 111 sets an initial value of a voxel identifier: i.

Specifically, voxel identifier initial value setting that satisfies i=0 is performed.

A specific example of the voxel will be described with reference to FIG. 8.

The voxel is a region corresponding to a cube as a component of a three-dimensional space. As illustrated in FIG. 8, one cube obtained by subdividing a TSDF space (TSDF Volume) defined as a location region in the three-dimensional space is the voxel.

A specific example of processing executed in accordance with the flow illustrated in FIG. 7 will be described with reference to FIG. 9.

Figure 9:
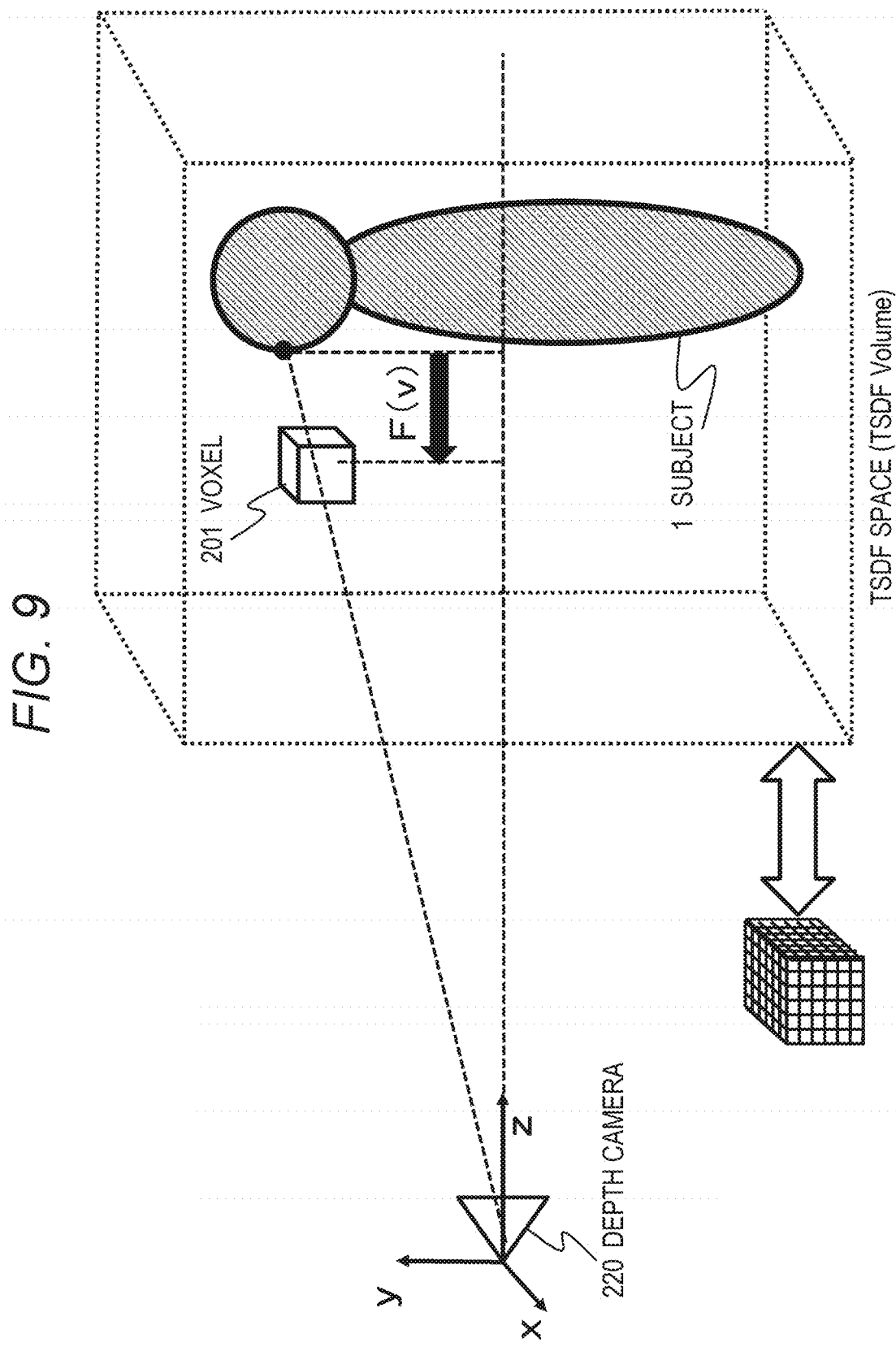
FIG. 9 is a view for explaining a TSDF space (TSDF Volume) and a voxel.

In FIG. 9, a three-dimensional space including the subject 1 to be the analysis target in the three-dimensional structure is set as a TSDF space (TSDF Volume), and one voxel 201 in the TSDF space (TSDF Volume) is shown.

The voxel 201 exists between the subject 1 and a depth camera 220 that has captured a depth map. An optical axis direction in front of the depth camera 220 is defined as a Z axis (depth), and a vertical upward direction is defined as a y axis. Note that these coordinate axes are camera coordinates.

In the TSDF space (TSDF Volume) generation processing executed in accordance with the flow illustrated in FIG. 7, a process of storing a signed distance value F(v) (TSDF value) in each voxel constituting the TSDF space (TSDF Volume) is executed.

As illustrated in FIG. 9, the signed distance value F(v) (TSDF value) stores a distance between the voxel 201 and the subject with a plus or minus sign. The plus or minus sign is determined depending on whether the voxel is outside or inside the subject.

When a value of Z of the voxel 201 as seen from the depth camera is smaller than a value of Z of a subject surface, a plus sign is given since the voxel 201 is in front of the subject as seen from the camera and outside the subject. Conversely, when the value of Z of the voxel 201 is larger than the value of Z of the subject surface, a minus sign is given.

As described above, in each of the voxels constituting the TSDF space (TSDF Volume), the distance between the subject and the voxel is stored as the signed distance value F(v) (TSDF value).

Note that a relationship between the plus and minus signs and the inside and outside of the subject is only required to be unified in the entire system, and the outside of the subject may be expressed as minus and the inside of the subject as plus.

Note that, the voxel further stores, in addition to this signed distance value F(v) (TSDF value), a value (reliability value) indicating reliability of the signed distance value F(v) (TSDF value) in association.

As the reliability, for example, a value corresponding to received light intensity of infrared light (IR light) in each pixel unit by the depth camera is set. High reliability is obtained when the received light intensity of infrared light (IR light) is high, and low reliability is obtained when the received light intensity of infrared light (IR light) is low.

For example, a value of the reliability value is set in a range of 1.0 to 0.0 with the highest reliability=1.0 and the lowest reliability=0.

As described above, each of the voxels constituting the TSDF space (TSDF Volume) stores the signed distance value F(v) (TSDF value) between the voxel and the subject and its reliability value (for example, 0 to 1).

Returning to the flow illustrated in FIG. 7, the description of the processing executed by the TSDF space (TSDF Volume) generation unit 111 will be continued.

In step S101, when the initial value setting of the voxel identifier: i, that is, the voxel identifier initial value setting that satisfies i=0 is completed, the process proceeds to step S102.

(Step S102)

In step S102, coordinates of an i-th voxel are acquired.

Here, coordinates of the i-th voxel on voxel coordinate axes are acquired by using the voxel coordinate axes.

Figure 8:
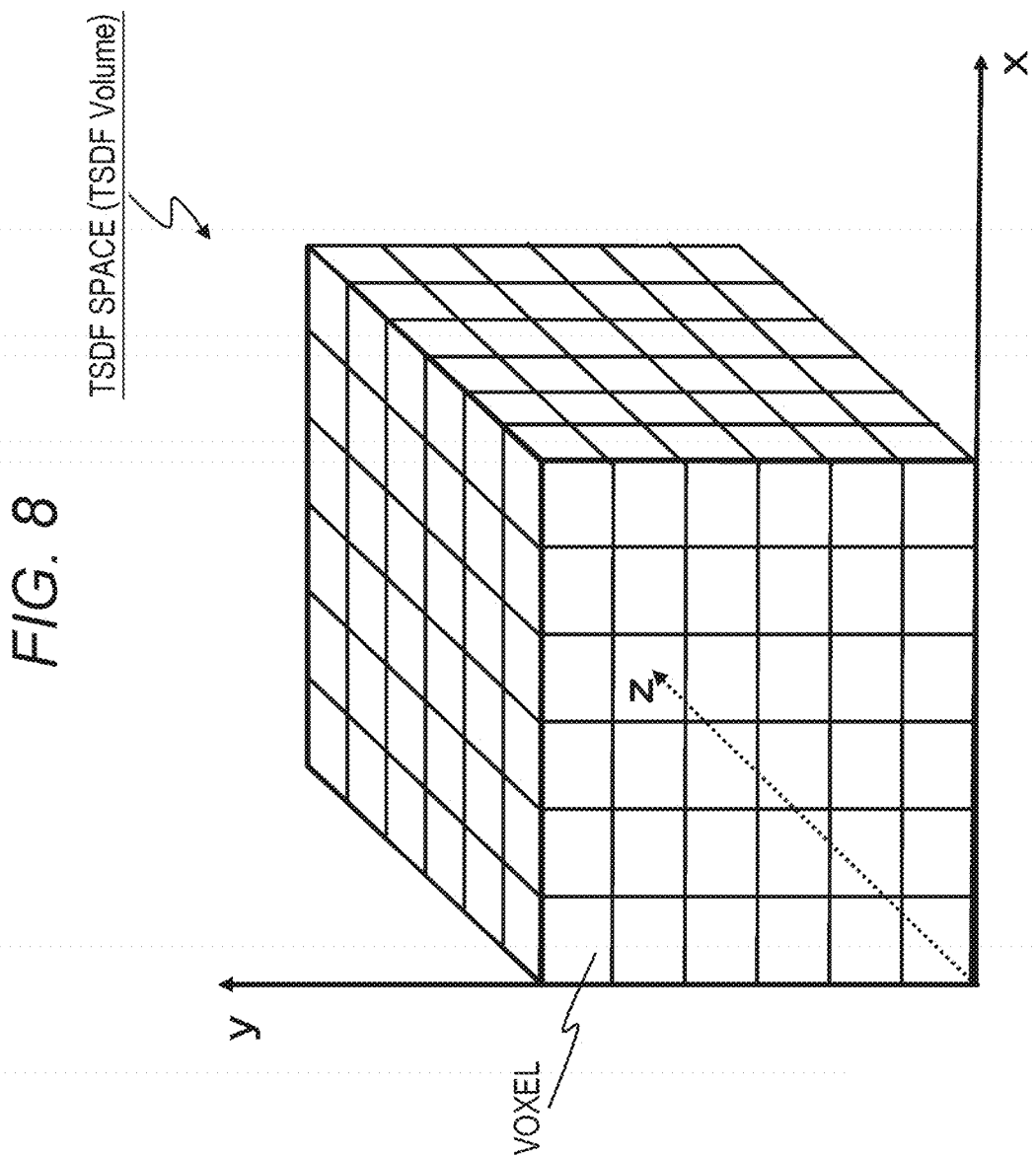
FIG. 8 is a view for explaining a specific example of a voxel.

The voxel coordinate axes are, for example, coordinate axes configured by coordinate axes x, y, and z of the TSDF space (TSDF Volume) illustrated in FIG. 8.

In step S102, coordinates (x, y, z) of the selected voxel (voxel identifier=i) on the voxel coordinate axes are acquired.

(Step S103)

Next, in step S103, coordinates (x, y, z) according to the voxel coordinate axes of the selected voxel (voxel identifier=i) acquired in step S102 are converted into world coordinates.

The world coordinates are coordinates having coordinate axes corresponding to a real region where the subject and the camera are present.

From a voxel location (X, Y, Z) according to the world coordinates obtained by this conversion processing, a relative location with respect to each location of the subject and the camera on the same world coordinates can also be calculated.

(Step S104)

Next, the voxel location (X, Y, Z) according to the world coordinates calculated in step S103 is converted into camera coordinates.

The camera coordinates are coordinates according to coordinate axes with, as an origin, a location of a depth camera that has captured a depth map to be processed by the TSDF space (TSDF Volume) generation unit 111.

For example, the camera coordinates are coordinates according to the coordinate axes (x, y, z) shown on the depth camera 220 illustrated in FIG. 9.

By using the camera coordinates, the calculation processing of the signed distance value F(v) (TSDF value) stored in the voxel described above with reference to FIG. 9 is to be executed.

(Step S105)

Next, in step S105, the signed distance value: F(v) is calculated on the basis of the voxel location in the camera coordinates of the voxel (identifier=i) selected in step S102 and the depth value (depth (distance)) obtained from the depth map.

This processing is the processing described above with reference to FIG. 9.

As described above with reference to FIG. 9, the signed distance value F(v) (TSDF value) is a value in which the distance between the voxel and the subject is stored with a sign.

In step S105, the signed distance value F(v) (TSDF value) corresponding to the voxel (identifier=i) selected in step S102 is calculated.

(Step S106)

Next, in step S106, a distance absolute value included in the signed distance value F(v) (TSDF value) that is calculated in step S105 and corresponds to the voxel (identifier=i) is compared with a predefined threshold value, and it is determined whether or not the distance absolute value is larger than the threshold value.

When it is determined that the distance absolute value is larger than the threshold value, the process proceeds to step S108 without performing the processing of step S107.

When it is determined that the distance absolute value is not larger than the threshold value, the processing of step S107 is executed.

That is, when it is determined that the distance absolute value is larger than the threshold value, the signed distance value F(v) (TSDF value) calculated in step S105 is determined to be an invalid value, and storage processing for the voxel of F(v) in step S107 is not performed.

Figure 10:
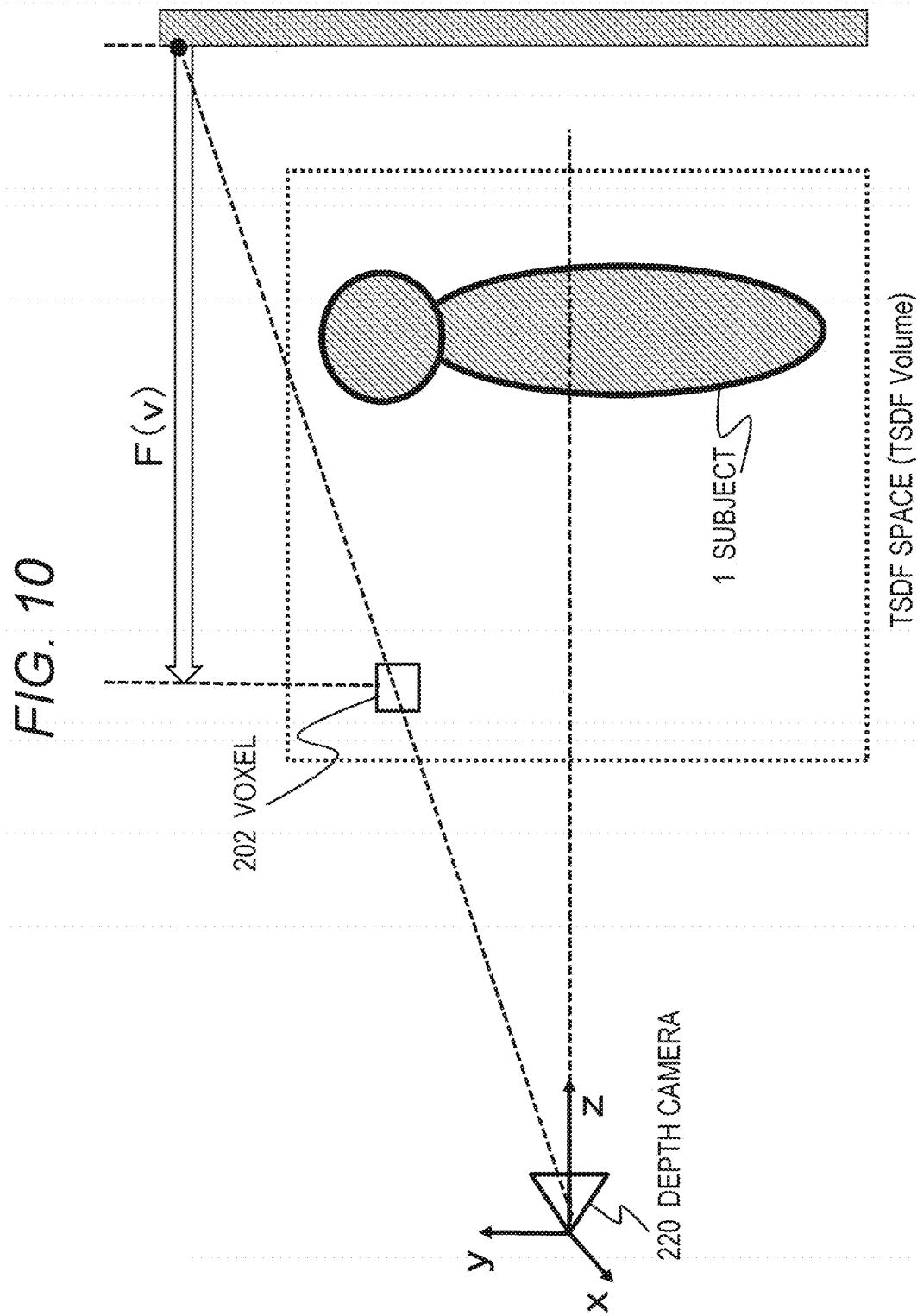
FIG. 10 is a view for explaining a TSDF space (TSDF Volume) and a voxel.

This processing is, for example, processing for not storing a value unnecessary for restoring the three-dimensional shape of the subject 1 into the voxel. One specific example thereof is, for example, a case as illustrated in FIG. 10. As illustrated in FIG. 10, the signed distance value F(v) (TSDF value) calculated for a voxel 202 illustrated in FIG. 10 is to have a distance value corresponding to a distance between a back wall of the subject 1 and the voxel 202. This distance value is a value unnecessary for restoring the three-dimensional shape of the subject 1. In such a case illustrated in FIG. 10, the signed distance value F(v) (TSDF value) having a large distance value is determined to be an invalid value, and is not to be stored in the voxel.

However, the example illustrated in FIG. 10 is an example, and necessity determination for voxel storage processing of F(v) can be performed under various conditions other than this.

Note that the threshold value is defined in advance on the basis of a subject location and a location of the TSDF space in which the voxels are arranged.

(Step S107)

When it is determined in step S106 that the distance absolute value included in the signed distance value F(v) (TSDF value) corresponding to the voxel (identifier=i) is not larger than the threshold value, the processing of step S107 is executed.

In step S107, the signed distance value F(v) (TSDF value) calculated in step S105 and corresponding to the voxel (identifier=i) is stored in the voxel (identifier=i).

Note that, as described above, additionally, the voxel further stores the value (reliability value) indicating reliability as well, in association with the signed distance value F(v) (TSDF value).

As the reliability, for example, a value corresponding to received light intensity of infrared light (IR light) in each pixel unit by the depth camera is set. High reliability is obtained when the received light intensity of infrared light (IR light) is high, and low reliability is obtained when the received light intensity of infrared light (IR light) is low.

For example, a value of the reliability value is set in a range of 1.0 to 0.0 with the highest reliability=1.0 and the lowest reliability=0.

In step S107, the signed distance value F(v) (TSDF value) and its reliability value (for example, 0 to 1) are stored in the voxel (identifier=i).

(Steps S108 and S109)

Step S108 is a step of determining the presence or absence of an unprocessed voxel. It is determined whether or not the processing on all the voxels constituting the TSDF space (TSDF Volume) has been completed.

When there is an unprocessed voxel, the value of the voxel identifier: i is updated in step S109, and the processing in and after step S102 is executed for the voxel having the updated voxel identifier.

When it is determined in step S108 that the processing on all the voxels constituting the TSDF space (TSDF Volume) has been completed, the process ends.

By executing the flow illustrated in FIG. 7, the signed distance value F(v) (TSDF value) between the subject and the voxel and the value (reliability value) indicating the reliability thereof are stored in each of the voxels constituting the TSDF space (TSDF Volume).

Each of the TSDF space (TSDF Volume) generation units 111-1 to N in the image processing unit 100 illustrated in FIG. 5 inputs depth camera data of one RGB-D camera 10, and executes processing according to the flow illustrated in FIG. 7.

Note that the TSDF space (TSDF Volume) used by each of the TSDF space (TSDF Volume) generation units 111-1 to N is one common space configured at the same location on the world coordinates.

Each of the TSDF space (TSDF Volume) generation units 111-1 to N stores, in a large number of voxels configured in one TSDF space (TSDF Volume), the signed distance value F(v) (TSDF value) calculated on the basis of captured images (depth maps) of cameras at different locations and the value (reliability value) indicating the reliability thereof.

N pieces of TSDF space (TSDF Volume) generated by the TSDF space (TSDF Volume) generation units 111-1 to N are inputted to the TSDF space (TSDF Volume) integration unit 131.

2-2. About Processing Executed by Visual Volume Intersection Method (Visual Hull) Based Three-Dimensional Shape (Polygon Mesh) Generation Unit Next, processing executed by the visual volume intersection method (Visual Hull) based three-dimensional shape (polygon mesh) generation unit 121 illustrated in FIG. 5 will be described.

The visual volume intersection method (Visual Hull) based three-dimensional shape (polygon mesh) generation unit 121 inputs the RGB camera data 60-1 to N including RGB images captured by the RGB-D cameras 10 that capture images of the subject 1 from a plurality of different locations illustrated in FIG. 1.

Note that, as described above with reference to FIG. 6, in each of the RGB camera data 60-1 to N, (a) an RGB image,
(b) camera internal parameters, and
(c) camera external parameters, these pieces of data are individually included.

The (a) RGB image is the RGB image described above with reference to FIGS. 2A and 2B, and is an RGB color image that can be captured by a normal camera.

The (b) camera internal parameters are parameters required for calculation processing of the subject three-dimensional shape based on the visual volume intersection method (Visual Hull) based on the RGB image, and are, for example, camera internal parameters such as a focal length and an optical center of the camera.

The (c) camera external parameters are also parameters required for calculation processing of the subject three-dimensional shape based on the visual volume intersection method (Visual Hull) based on the RGB image, and are, for example, camera external parameters such as location information and image-capturing direction information of the camera.

The RGB camera data including these pieces of data is inputted from individual cameras around the subject to the visual volume intersection method (Visual Hull) based three-dimensional shape (polygon mesh) generation unit 121.

The visual volume intersection method (Visual Hull) based three-dimensional shape (polygon mesh) generation unit 121 executes the visual volume intersection method (Visual Hull) on the basis of these pieces of input data, to generate a subject three-dimensional shape (polygon mesh).

The visual volume intersection method (Visual Hull) will be described with reference to FIG. 11 and subsequent drawings.

Figure 11:
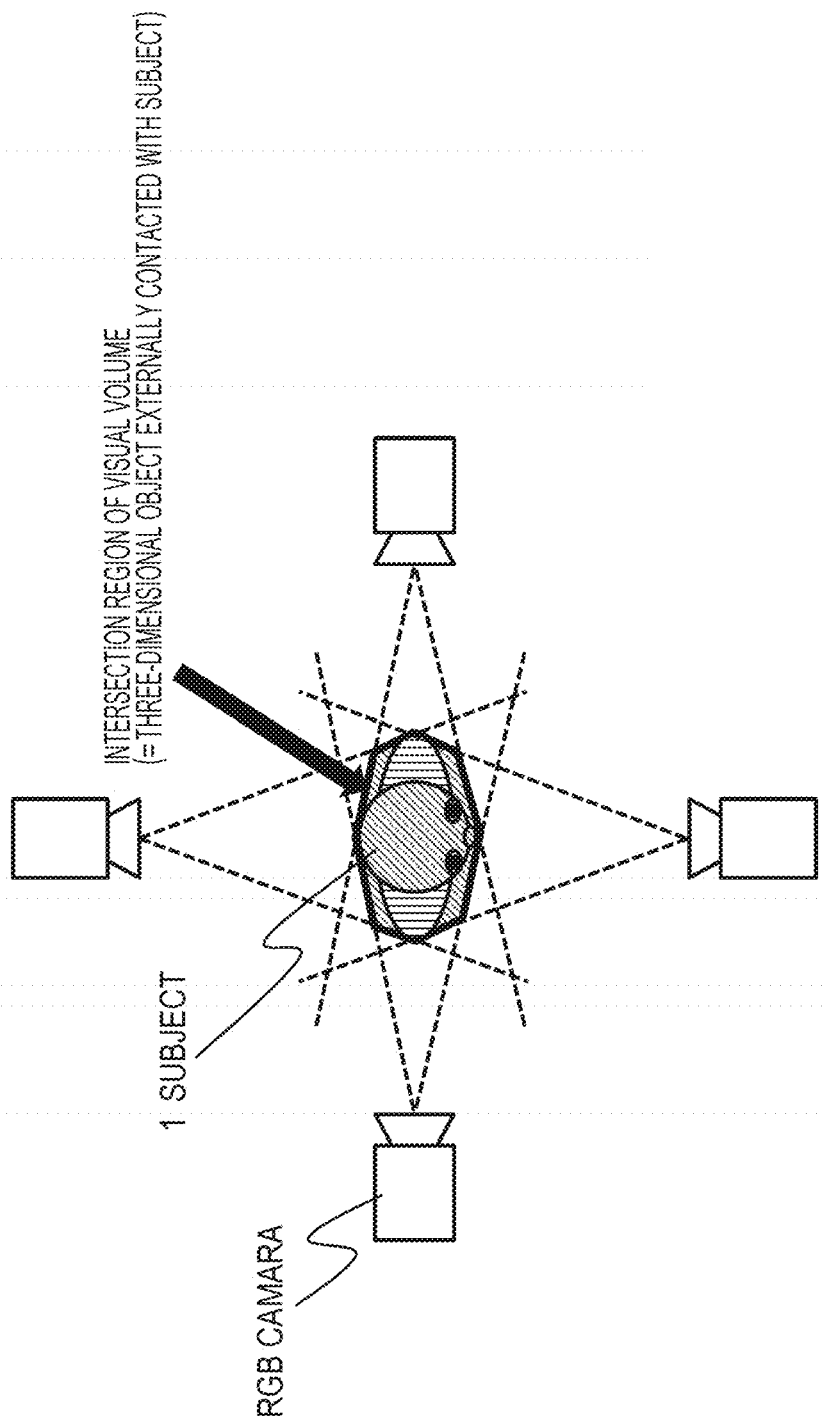
FIG. 11 is a view for explaining a visual volume intersection method (Visual Hull).

FIG. 11 illustrates four RGB cameras around the subject 1. Individual cameras capture images of the subject 1 from different directions. In this example, the captured image is an RGB color image, but may be a monochrome image.

Each camera captures an image of the subject 1 from a specific direction, and a silhouette obtained by observing the subject 1 from the specific direction can be acquired from the captured image.

Figure 12:
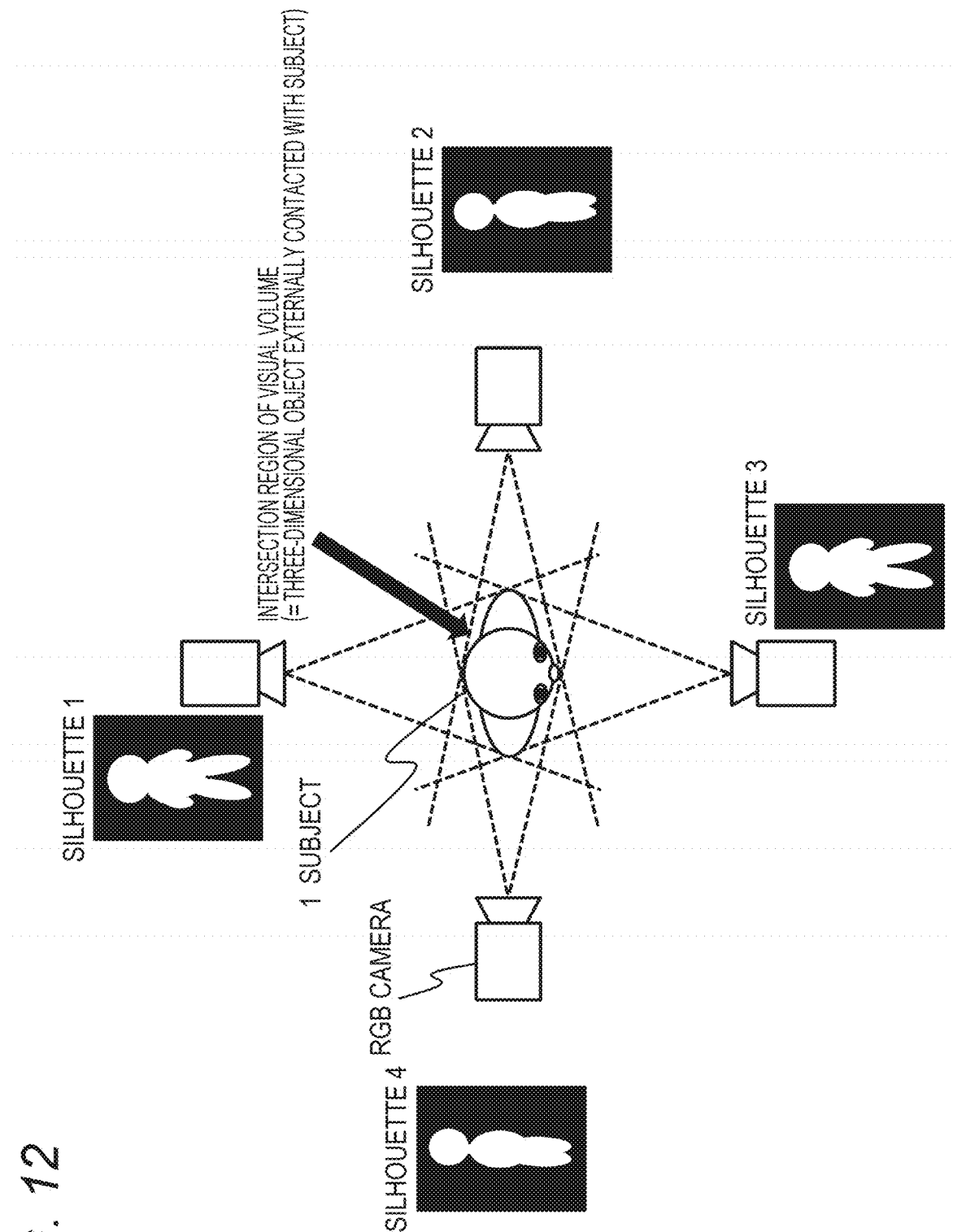
FIG. 12 is a view for explaining an example of a silhouette acquired from a captured image of each camera.

FIG. 12 illustrates an example of the silhouette acquired from the captured image of each camera. FIG. 12 illustrates silhouettes based on captured images of cameras that capture images of the subject 1 from individually different directions. The silhouettes are silhouettes 1 to 4 illustrated in FIG. 12. The visual volume intersection method (Visual Hull) is a method of acquiring a three-dimensional shape of a subject, by extracting and storing an AND region of silhouettes of the subject in individual RGB cameras that capture images of the subject.

Specifically, for example, the following processing is executed.

(Process 1) A target space (volume) including a subject captured by the RGB camera is defined, coordinates of each voxel in the space (volume) are projected to each camera, and whether the voxel is inside or outside the subject silhouette is determined.

(Process 2) A voxel determined to be inside the subject in all the cameras is determined to be in an internal region of a subject shape, the other voxels are determined to be external, and a label corresponding to the determination result is set for each voxel.

(Process 3) A three-dimensional shape of a subject is acquired by applying marching cubes to a space (volume) having a plurality of labeled voxels.

Note that the marching cubes is an algorithm that converts data including a plurality of voxels into a three-dimensional shape.

As described above, the visual volume intersection method (Visual Hull) based three-dimensional shape (polygon mesh) generation unit 121 in the image processing unit 100 illustrated in FIG. 5 executes the visual volume intersection method (Visual Hull) by applying RGB images obtained by capturing images of the subject 1 from different directions, to generate a subject three-dimensional shape (polygon mesh) of the subject 1.

The subject three-dimensional shape (polygon mesh) of the subject 1 generated by the visual volume intersection method (Visual Hull) based three-dimensional shape (polygon mesh) generation unit 121 is inputted to the polygon mesh based TSDF space (TSDF Volume) generation unit 122.

2-3. About Processing Executed by Polygon Mesh Based TSDF Space (TSDF Volume) Generation Unit Next, processing executed by the polygon mesh based TSDF space (TSDF Volume) generation unit 122 will be described.

The polygon mesh based TSDF space (TSDF Volume) generation unit 122 converts, into a TSDF space (TSDF Volume), the subject three-dimensional shape (polygon mesh) of the subject 1 generated by the visual volume intersection method (Visual Hull) based three-dimensional shape (polygon mesh) generation unit 121.

As described above, the TSDF space (TSDF Volume) is a data structure in which the signed distance value F(v) (TSDF value) is stored in a large number of voxels inside the space.

This data structure can be generated from the three-dimensional structure (polygon mesh) of the subject.

As described above with reference to FIG. 9 and the like, the signed distance value F(v) (TSDF value) between the subject and the voxel is stored in each voxel in the TSDF space (TSDF Volume).

If a subject shape is known, and a location of each voxel in the TSDF space (TSDF Volume) including the subject is also known, a distance to the subject and whether it is inside or outside the subject can be analyzed for each voxel. That is, the signed distance value F(v) (TSDF value) can be calculated.

In this way, the polygon mesh based TSDF space (TSDF Volume) generation unit 122 converts, into a TSDF space (TSDF Volume), the subject three-dimensional shape (polygon mesh) of the subject 1 generated by the visual volume intersection method (Visual Hull) based three-dimensional shape (polygon mesh) generation unit 121.

Note that a location (location on the world coordinates) of the TSDF space (TSDF Volume) generated by the polygon mesh based TSDF space (TSDF Volume) generation unit 122 is set to the same location as the locations of the N pieces of TSDF space (TSDF Volume) generated by the TSDF space (TSDF Volume) generation units 111-1 to N described above. That is, a common TSDF space (TSDF Volume) is used.

As a result, all locations of voxels in the TSDF space (TSDF Volume) generated by the polygon mesh based TSDF space (TSDF Volume) generation unit 122 and the TSDF space (TSDF Volume) are to be the same location in one common TSDF space (TSDF Volume).

Note that, for each voxel of the TSDF space (TSDF Volume) generated by the polygon mesh based TSDF space (TSDF Volume) generation unit 122, the reliability value=0.5, which is an intermediate value, is stored in addition to the signed distance value F(v) (TSDF value), when a predetermined reliability value, for example, reliability=0 to 1.0 is set.

The TSDF space (TSDF Volume) generated by the polygon mesh based TSDF space (TSDF Volume) generation unit 122 is inputted to the TSDF space (TSDF Volume) integration unit 131.

2-4. About Processing Executed by TSDF Space (TSDF Volume) Integration Unit

Next, processing executed by the TSDF space (TSDF Volume) integration unit 131 will be described.

The TSDF space (TSDF Volume) integration unit 131 inputs the following data.
- (A) The N pieces of TSDF space (TSDF Volume) generated by the TSDF space (TSDF Volume) generation units 111-1 to N
- (B) The TSDF space (TSDF Volume) generated by the polygon mesh based TSDF space (TSDF Volume) generation unit 122

The (A) described above is the N pieces of TSDF space (TSDF Volume) generated on the basis of N pieces of depth map obtained by capturing images of the subject from N different locations by N pieces of RGB-D camera 10.

Furthermore, (B) is one TSDF space (TSDF Volume) generated on the basis of a subject three-dimensional shape (polygon mesh) generated by the visual volume intersection method (Visual Hull) to which N pieces of RGB image obtained by capturing images of the subject from N different locations by N pieces of RGB-D camera 10 are applied.

That is, the TSDF space (TSDF Volume) integration unit 131 inputs N+1 pieces of TSDF space (TSDF Volume).

Note that, as described above, the TSDF space (TSDF Volume) generated by the polygon mesh based TSDF space (TSDF Volume) generation unit 122 and the TSDF space (TSDF Volume) are at the same location on the world coordinates, and all locations of voxels in these N+1 pieces of TSDF space (TSDF Volume) are also at the same location.

In the voxels in the N+1 pieces of TSDF space (TSDF Volume), individually different signed distance values F(v) (TSDF values) and their reliability values (0 to 1) are stored.

When a plurality of signed distance values F(v) (TSDF values) is detected in voxels at the same location in the N+1 pieces of TSDF space (TSDF Volume), the TSDF space (TSDF Volume) integration unit 131 calculates a final one signed distance value F'(v) on the basis of the plurality of signed distance values F(v).

For example, the one final signed distance value F'(v) is calculated by executing weighting addition to which a reliability value recorded in association with each signed distance value F(v) is applied.

A specific calculation formula of the final one signed distance value F'(v) is, for example, the following (Equation 1).

[Formula 1]

$$F'(v) = \frac{\sum_{i=1}^{N+1} w_i(v) F_{i(v)}}{\sum_{i=1}^{N+1} w_i(v)} \quad \text{(EQUATION 1)}$$

Note that, in (Equation 1) described above,
i is an identifier of a TSDF space (TSDF Volume),
Fi(v) is a signed distance value in a voxel v of the TSDF space (TSDF Volume) i, and
wi (v) is a weight value in the voxel v of the TSDF space (TSDF Volume) i.

As a weight value, reliability (0 to 1) of a TSDF value for each voxel can be applied.

Note that, as the reliability, for example, a luminance value of infrared light (IR light) in each pixel described above can be used. Furthermore, in addition to this, the reliability may be calculated by using the following camera arrangement information,
- (a) an angle between a normal direction of a subject surface and a camera location, and
- (b) a distance from the camera to the subject surface, and used as a weight value of (Equation 1) described above.

As described above, the TSDF space (TSDF Volume) integration unit 131 uses the signed distance values F(v) stored in the corresponding voxels of the N+1 pieces of TSDF space (TSDF Volume), to generate one integrated TSDF space (TSDF Volume) in which one signed distance value F(v) is stored in each voxel, at the end.

The one integrated TSDF space (TSDF Volume) generated by the TSDF space (TSDF Volume) integration unit 131 is outputted to the three-dimensional shape generation unit 132.

2-5. About Processing Executed by Three-Dimensional Shape Generation Unit

Next, processing executed by the three-dimensional shape generation unit 132 will be described.

The three-dimensional shape generation unit 132 inputs the one integrated TSDF space (TSDF Volume) generated by the TSDF space (TSDF Volume) integration unit 131, from the TSDF space (TSDF Volume) integration unit 131.

The three-dimensional shape generation unit 132 restores the three-dimensional shape of the subject by using this one integrated TSDF space (TSDF Volume).

One signed distance value F(v) is stored in a voxel of the one integrated TSDF space (TSDF Volume), and the three-dimensional structure of the subject can be restored on the basis of this value.

For example, by extracting a location of zero-cross by the marching cubes, a mesh that is a highly accurate surface shape of the subject can be acquired, and a three-dimensional structure of the subject including the mesh can be generated.

Note that, as described above, in the depth map, accuracy of depth information of a region such as black hair is low, and a low reliability signed distance value F(v) is stored in the voxel of the TSDF space (TSDF Volume) generated on the basis of the depth map. Therefore, even if an attempt is made to restore the three-dimensional shape of the subject by using this value, a highly accurate three-dimensional shape cannot be restored.

In a technique of the present disclosure, for such a region, it is possible to perform three-dimensional shape restoration to which the signed distance value F(v) stored in the voxel of the TSDF space (TSDF Volume) generated on the basis of the RGB image is applied, and highly accurate three-dimensional shape restoration of the entire subject is achieved.

3. About Processing Sequence Executed by Image Processing Apparatus of Present Disclosure Next, a processing sequence executed by the image processing apparatus 20 of the present disclosure will be described.

Figure 13:
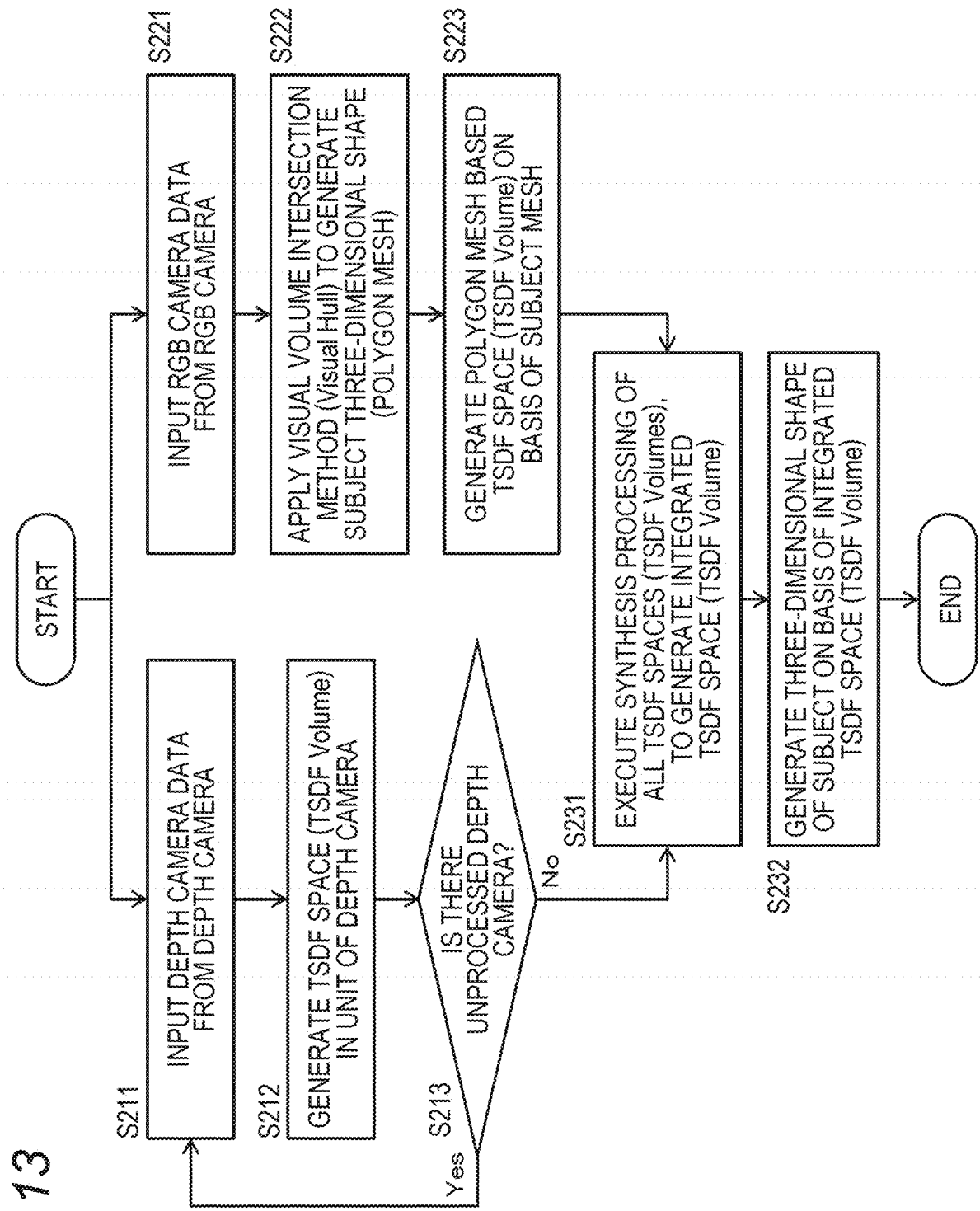
FIG. 13 is a view illustrating a flowchart for explaining a processing sequence executed by the image processing apparatus of the present disclosure.

The flowchart illustrated in FIG. 13 is a flowchart for explaining a processing sequence executed by the image processing apparatus 20 of the present disclosure. Note that the processing according to the flow illustrated in FIG. 13 can be executed under control of a CPU or the like having a program execution function, in accordance with a program stored in a storage unit of the image processing apparatus 20, for example.

Processing of each step in the flow shown in FIG. 13 will be sequentially described.

Note that the processing of steps S211 to S213 of the flow illustrated in FIG. 13 is processing executed by the TSDF space (TSDF Volume) generation unit 111 illustrated in FIG. 5, and the processing of steps S221 to S223 is processing executed by the visual volume intersection method (Visual Hull) based three-dimensional shape (polygon mesh) generation unit 121 and the polygon mesh based TSDF space (TSDF Volume) generation unit 122 illustrated in FIG. 5.

Note that, the processing of steps S211 to S213 and the processing of steps S221 to S223 are processing that can be executed independently in parallel.

First, the processing of steps S211 to S213 will be described.
(Step S211)

The processing of steps S211 to S213 is processing executed in the TSDF space (TSDF Volume) generation unit 111 illustrated in FIG. 5.

First, in step S211, the TSDF space (TSDF Volume) generation unit 111 inputs depth camera data from each of the RGB-D cameras 10 illustrated in FIG. 1.

The depth camera data contains the following data described above with reference to FIG. 6:
(a) depth map,
(b) camera internal parameters, and
(c) camera external parameters.

The (a) depth map is the depth map described above with reference to FIGS. 2A and 2B, and is an image in which a density value corresponding to a distance from the camera is set to each pixel.

The (b) camera internal parameters are parameters required for the TSDF space (TSDF Volume) generation processing based on the depth map, and are, for example, camera internal parameters such as a focal length and an optical center of the camera.

The (c) camera external parameters are also parameters required for the TSDF space (TSDF Volume) generation processing based on the depth map, and are, for example, camera external parameters such as location information and image-capturing direction information of the camera.
(Step S212)

Next, in step S212, the TSDF space (TSDF Volume) generation unit 111 inputs the depth camera data, and generates a TSDF space (TSDF Volume).

This processing corresponds to the flow illustrated in FIG. 7 and the processing described above with reference to FIGS. 8 and 9. Specifically, a process of storing the signed distance value F(v) (TSDF value) in each voxel constituting the TSDF space (TSDF Volume) is executed.

As illustrated in FIG. 9, the signed distance value F(v) (TSDF value) is a value including a distance between the voxel 201 and the subject and including a plus or minus sign indicating whether the subject is inside or outside.

Note that, additionally, the voxel also stores a value (reliability value) indicating reliability, in association with the signed distance value F(v) (TSDF value).
(Step S213)

Step S213 next is determination processing as to whether or not generation of the TSDF space (TSDF Volume) based on the depth maps acquired by all the depth cameras has been completed.

When there is an unprocessed depth map, the processing of steps S211 to S212 is executed for the unprocessed depth map.

When it is determined that the generation of the TSDF space (TSDF Volume) based on the depth maps acquired by all the depth cameras has been completed, the process proceeds to step S231.

Note that, at this point, for example, when there are N pieces of depth camera, it means that N pieces of TSDF space (TSDF Volume) are generated.

In voxels of the N pieces of TSDF space (TSDF Volume), the signed distance value F(v) (TSDF value) and its reliability value are stored.

The N pieces of TSDF space (TSDF Volume) generated by the TSDF space (TSDF Volume) generation unit 111 through the processing of steps S211 to S213 are inputted to the TSDF space (TSDF Volume) integration unit 131.
(Step S221)

Next, a description is given to the processing of steps S221 to S223 executed in the visual volume intersection method (Visual Hull) based three-dimensional shape (polygon mesh) generation unit 121 and the polygon mesh based TSDF space (TSDF Volume) generation unit 122 illustrated in FIG. 5.

First, in step S221, the visual volume intersection method (Visual Hull) based three-dimensional shape (polygon mesh) generation unit 121 inputs the RGB camera data 60-1 to N including RGB images captured by the RGB-D cameras 10 that capture images of the subject 1 from a plurality of different locations illustrated in FIG. 1.

As described above with reference to FIG. 6, in each of the RGB camera data 60-1 to N,
(a) an RGB image,
(b) camera internal parameters, and
(c) camera external parameters,
these pieces of data are individually included.

The (a) RGB image is the RGB image described above with reference to FIGS. 2A and 2B, and is an RGB color image that can be captured by a normal camera.

The (b) camera internal parameters are parameters required for calculation processing of the subject three-dimensional shape based on the visual volume intersection method (Visual Hull) based on the RGB image, and are, for example, camera internal parameters such as a focal length and an optical center of the camera.

The (c) camera external parameters are also parameters required for calculation processing of the subject three-dimensional shape based on the visual volume intersection method (Visual Hull) based on the RGB image, and are, for example, camera external parameters such as location information and image-capturing direction information of the camera.

(Step S222)

Next, in step S222, the visual volume intersection method (Visual Hull) based three-dimensional shape (polygon mesh) generation unit 121 executes the visual volume intersection method (Visual Hull), to generate a subject three-dimensional shape (polygon mesh).

This processing is the processing described above with reference to FIGS. 11 and 12.

Specifically, for example, the following processing is executed.

(Process 1) A target space (volume) including a subject captured by the RGB camera is defined, coordinates of each voxel in the space (volume) are projected to each camera, and whether the voxel is inside or outside the subject silhouette is determined.

(Process 2) A voxel determined to be inside the subject in all the cameras is determined to be in an internal region of a subject shape, the other voxels are determined to be external, and a label corresponding to the determination result is set for each voxel.

(Process 3) A three-dimensional shape of a subject is acquired by applying marching cubes to a space (volume) having a plurality of labeled voxels.

(Step S223)

Next, in the polygon mesh based TSDF space (TSDF Volume) generation unit 122, in step S223, the polygon mesh based TSDF space (TSDF Volume) generation unit 122 converts, into a TSDF space (TSDF Volume), the subject three-dimensional shape (polygon mesh) of the subject 1 generated by the visual volume intersection method (Visual Hull) based three-dimensional shape (polygon mesh) generation unit 121.

Note that, for each voxel of the TSDF space (TSDF Volume) generated by the polygon mesh based TSDF space (TSDF Volume) generation unit 122, the reliability value=0.5, which is an intermediate value, is stored in addition to the signed distance value F(v) (TSDF value), when a predetermined reliability value, for example, reliability=0 to 1.0 is set.

Note that the value of the reliability value can be variously set.

The TSDF space (TSDF Volume) generated by the polygon mesh based TSDF space (TSDF Volume) generation unit 122 is inputted to the TSDF space (TSDF Volume) integration unit 131.

(Step S231)

The processing of step S231 is processing executed by the TSDF space (TSDF Volume) integration unit 131.

The TSDF space (TSDF Volume) integration unit 131 inputs the following data.

(A) The N pieces of TSDF space (TSDF Volume) generated by the TSDF space (TSDF Volume) generation units 111-1 to N (B) The TSDF space (TSDF Volume) generated by the polygon mesh based TSDF space (TSDF Volume) generation unit 122

In voxels in the N+1 pieces of TSDF space (TSDF Volume) in total of (A) and (B) described above, there are voxels storing individually different signed distance values F(v) (TSDF values) and their reliability values (0 to 1).

When a plurality of signed distance values F(v) (TSDF values) is detected in voxels at the same location in the N+1 pieces of TSDF space (TSDF Volume), on the basis of the plurality of signed distance values F(v), the TSDF space (TSDF Volume) integration unit 131 calculates a final one signed distance value F'(v) in accordance with (Equation 1) described above.

As described above, the TSDF space (TSDF Volume) integration unit 131 uses the signed distance values F(v) stored in the corresponding voxels of the N+1 pieces of TSDF space (TSDF Volume), to generate one integrated TSDF space (TSDF Volume) in which one signed distance value F(v) is stored in each voxel, at the end.

The one integrated TSDF space (TSDF Volume) generated by the TSDF space (TSDF Volume) integration unit 131 is outputted to the three-dimensional shape generation unit 132.

(Step S232)

The processing in the final step S232 is processing executed by the three-dimensional shape generation unit 132 of the image processing unit 100 illustrated in FIG. 5.

The three-dimensional shape generation unit 132 inputs the one integrated TSDF space (TSDF Volume) generated by the TSDF space (TSDF Volume) integration unit 131, from the TSDF space (TSDF Volume) integration unit 131.

The one signed distance value F(v) is stored in the voxel of the integrated TSDF space (TSDF Volume).

The three-dimensional shape generation unit 132 can restore the three-dimensional structure of the subject by analyzing the signed distance values F(v) of all the voxels on the basis of this voxel storage value.

For example, by extracting a location of zero-cross by the marching cubes, a mesh that is a highly accurate surface shape of the subject can be acquired, and a three-dimensional structure of the subject including the mesh can be generated.

As described above, the image processing apparatus of the present disclosure generates an integrated TSDF space (TSDF Volume) obtained by integrating a TSDF space (TSDF Volume) generated on the basis of a depth map and an RGB image-based TSDF space (TSDF Volume), and analyzes a three-dimensional shape of the subject on the basis of this integrated TSDF space (TSDF Volume), to generate highly accurate three-dimensional structure data of the subject.

In the depth map, accuracy of depth information of a region such as black hair is low, and a low reliability signed distance value F(v) is stored in the voxel of the TSDF space (TSDF Volume) generated on the basis of the depth map. Therefore, even if an attempt is made to restore the three-dimensional shape of the subject by using this value, a highly accurate shape cannot be restored.

However, in a technique of the present disclosure, for such a region, it is possible to perform three-dimensional shape restoration to which the signed distance value F(v) stored in the voxel of the TSDF space (TSDF Volume) generated on the basis of the RGB image is applied, and highly accurate three-dimensional shape restoration of the entire subject is achieved.

4. About Specific Example of Three-Dimensional Structure Data of Subject Obtained by Applying Processing of Present Disclosure Next, a specific example of three-dimensional structure data of the subject obtained by applying the processing of the present disclosure will be described.

Figure 14:
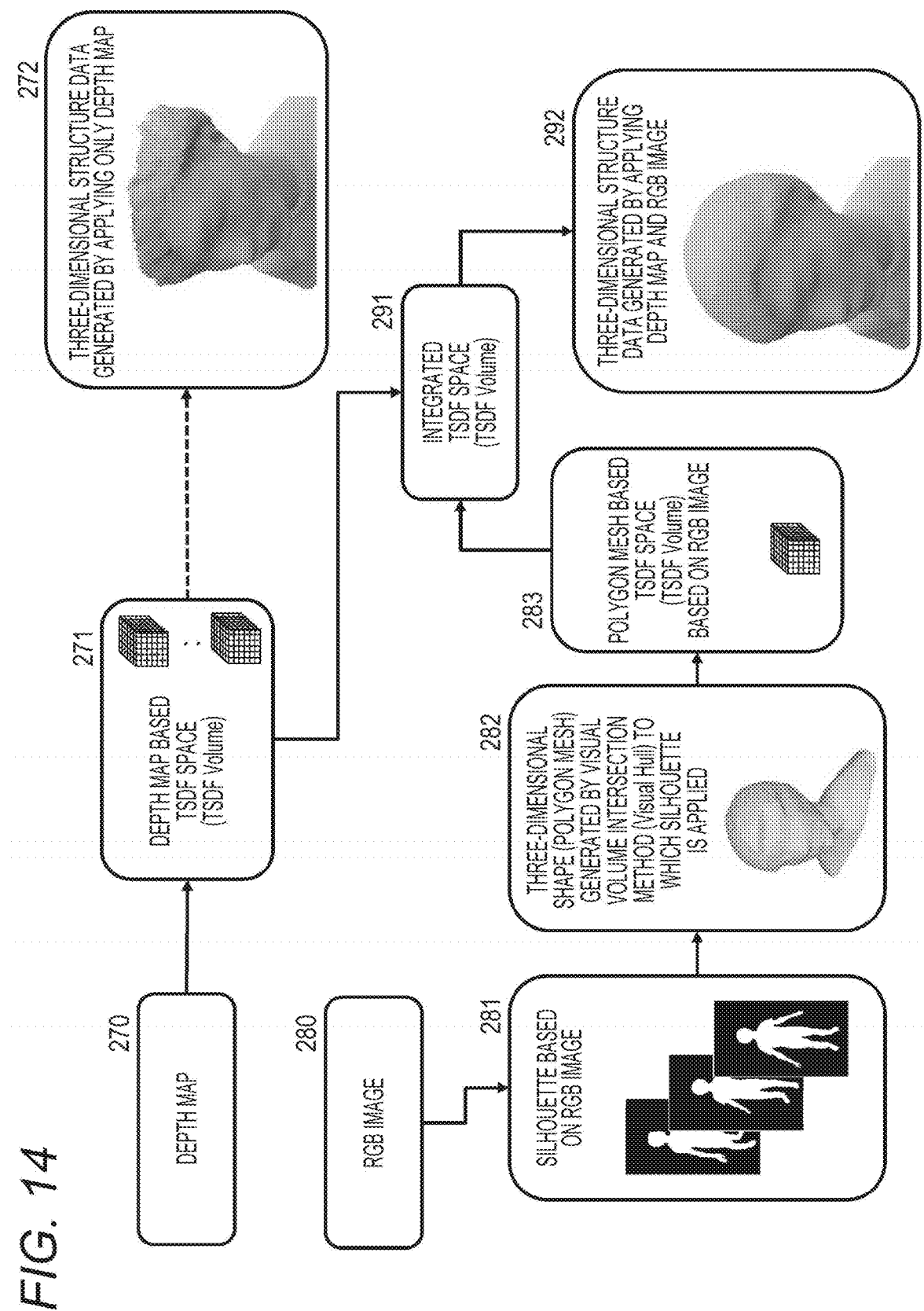
FIG. 14 is a diagram for explaining a specific example of data generated in accordance with processing executed by the image processing apparatus of the present disclosure.

FIG. 14 is a diagram for explaining a specific example of data generated in accordance with processing executed by the image processing apparatus of the present disclosure.

First, a depth map 270 and an RGB image 280 illustrated in FIG. 14 are acquired from the RGB-D camera that captures an image of the subject from various directions.

Note that the depth map 270 and the RGB image 280 illustrated in FIG. 14 are N pieces of depth map and N pieces of RGB image obtained by capturing images of the subject from various directions.

The N pieces of depth map 270 are inputted to the TSDF space (TSDF Volume) generation unit 111, and N pieces of TSDF space (TSDF Volume) 271 corresponding to the individual depth maps are generated.

An example of the subject three-dimensional structure generated on the basis of the N pieces of TSDF space (TSDF Volume) 211 is three-dimensional structure data 272 illustrated in FIG. 14.

Since the three-dimensional structure data 272 is generated using only the depth map, a region where a low accuracy depth value is set, for example, a black hair region is to be incomplete three-dimensional structure data in which the three-dimensional structure cannot be restored.

The three-dimensional structure data 272 illustrated in FIG. 14 is an example of data when the processing of the present disclosure is not applied.

Next, processing when the processing of the present disclosure is applied will be described.

The RGB image 281 is inputted to the visual volume intersection method (Visual Hull) based three-dimensional shape (polygon mesh) generation unit 121, and first, a silhouette 281 illustrated in FIG. 14 is generated.

This is the processing described above with reference to FIGS. 11 and 12.

Moreover, on the basis of the silhouette 281, the subject three-dimensional shape (polygon mesh) 282 is generated by the visual volume intersection method (Visual Hull).

Moreover, the polygon mesh based TSDF space (TSDF Volume) generation unit 122 generates a polygon mesh based TSDF space (TSDF Volume) 283 on the basis of the subject three-dimensional shape (polygon mesh) 282.

Next, the TSDF space (TSDF Volume) integration unit 131 inputs the following data.

(A) The N pieces of TSDF space (TSDF Volume) corresponding to the individual depth maps 271

(B) The polygon mesh based TSDF space (TSDF Volume) 283

The TSDF space (TSDF Volume) integration unit 131 synthesizes the plurality of TSDF spaces (TSDF Volumes), to generate one integrated TSDF space (TSDF Volume) 291.

Finally, on the basis of the one integrated TSDF space (TSDF Volume) 291, the three-dimensional shape generation unit 132 generates three-dimensional structure data 292 of the subject.

The three-dimensional structure data 292 of the subject illustrated in FIG. 14 is three-dimensional structure data generated on the basis of the integrated TSDF space (TSDF Volume) obtained by integrating the TSDF space (TSDF Volume) generated on the basis of the depth map and the RGB image-based TSDF space (TSDF Volume).

Although voxels in the TSDF space (TSDF Volume) generated on the basis of the depth map include voxels storing less accurate signed distance values F(v), it becomes possible to utilize a signed distance value F(v) of the RGB image-based TSDF space (TSDF Volume) for such voxels by applying the processing of the present disclosure.

As a result, highly accurate three-dimensional structure data of the subject can be generated.

5. About Other Embodiments

Next, other embodiments (modified examples) of the image processing apparatus of the present disclosure will be described.

5-1. Modified Example 1

In the above-described embodiment, as described above with reference to FIG. 1, a configuration has been adopted in which a plurality of cameras is arranged around a subject, and processing is performed using images captured by the plurality of cameras.

Figure 15:
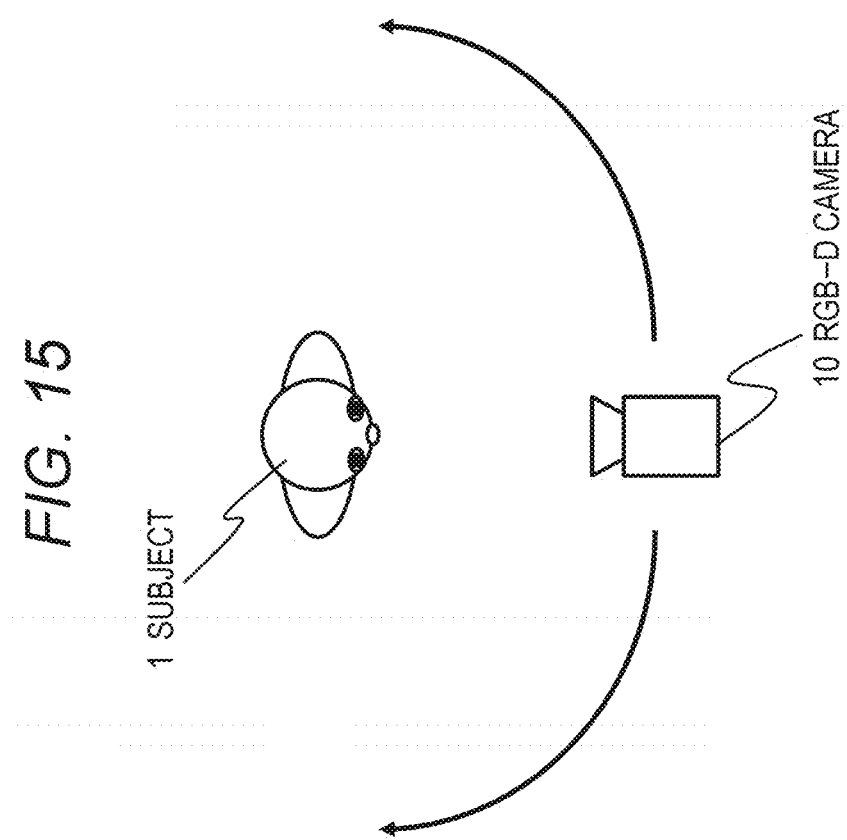
FIG. 15 is a view for explaining a configuration example of using only one camera rather than using a plurality of cameras.

Rather than using the plurality of cameras in this way, a configuration may be adopted in which only one camera is used. For example, as illustrated in FIG. 15, a configuration may be adopted in which one RGB-D camera 10 sequentially captures images (RGB image, depth map) while moving around the subject 1.

However, in a case of this method, it is necessary to acquire a location and a position of the camera corresponding to an image-capturing frame at each time. For camera location and position acquisition processing at each time point, an existing method, for example, a method such as KinectFusion or Visual SLAM, or a method such as Structure From Motion can be used.

5-2. Modified Example 2

Figure 16:
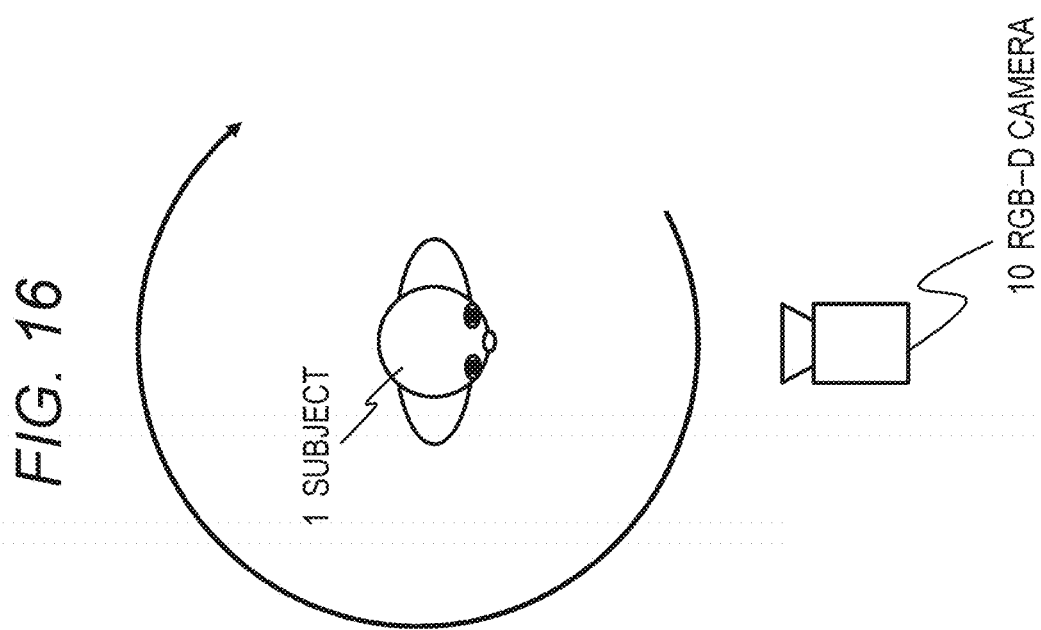
FIG. 16 is a view for explaining a configuration example of using only one camera rather than using a plurality of cameras.

Moreover, as illustrated in FIG. 16, a configuration may be adopted in which, by continuously capturing an image of the subject while rotationally moving the subject 1 in front of one fixed RGB-D camera 10, subject images (RGB image, depth map) are sequentially captured from different locations.

For example, the subject 1 is rotationally moved on a turntable. In this case, similarly to Modified example 1 described above, a method represented by visual SLAM and the like can be used for the camera location and position acquisition processing.

Even when the motion of the subject 1 is a non-rigid motion, by applying an existing method, for example, a method such as "DynamicFusion", the camera location and position can be estimated by combining estimation of Warp-Field that parametrically expresses the non-rigid motion in each video frame.

5-3. Modified Example 3

Moreover, as a modified example of the image processing apparatus of the present disclosure, it is possible to adopt a configuration of reducing a calculation amount of the generation processing of the TSDF space (TSDF Volume) to which the visual volume intersection method (Visual Hull) described above is applied.

That is, a configuration may be adopted in which, without calculating the signed distance values F(v) (TSDF values) of all voxels for the TSDF space (TSDF Volume) to which the visual volume intersection method (Visual Hull) described above is applied, the signed distance value F(v) (TSDF value) is calculated by selecting only voxels corresponding to a region where the reliability of the depth value acquired from the depth map is low.

As described above, the reliability of the depth value of the depth map can be determined by high or low of a luminance value of the infrared light (IR light). A depth value of a pixel having a low luminance value of infrared light (IR light) is determined to have low reliability.

A configuration may be adopted in which only voxels corresponding to such a region where the reliability of the depth value is low are selected from the TSDF space (TSDF Volume) to which the visual volume intersection method (Visual Hull) is applied, and the signed distance value F(v) (TSDF value) is calculated only for these selected voxels.

5-4. Modified Example 4

Furthermore, when a subject region with low reliability of the depth value of the depth map can be estimated in advance, only voxels corresponding to the subject region may be set as the voxels to be subjected to the signed distance value F(v) (TSDF value) calculation of the TSDF space (TSDF Volume) to which the visual volume intersection method (Visual Hull) is applied.

For example, when the three-dimensional shape restoration target is a human, a region of a head part (hair) can be estimated as a region where the reliability of the depth value of the depth map is low. In this case, only voxels corresponding to the hair region of the subject are set as voxels to be subjected to the signed distance value F(v) (TSDF value) calculation of the TSDF space (TSDF Volume) to which the visual volume intersection method (Visual Hull) is applied.

5-5. Modified Example 5

In the embodiment described above, the TSDF space (TSDF Volume) integration unit 131 has executed the following processing.

That is, with
(A) the N pieces of TSDF space (TSDF Volume) generated by the TSDF space (TSDF Volume) generation units 111-1 to N, and
(B) the TSDF space (TSDF Volume) generated by the polygon mesh based TSDF space (TSDF Volume) generation unit 122, when a plurality of signed distance values F(v) (TSDF values) has been detected in voxels at the same location in these N+1 pieces of TSDF space (TSDF Volume), a final one signed distance value F'(v) has been calculated in accordance with (Equation 1) described above, on the basis of the plurality of signed distance values F(v).

Moreover, a configuration has been adopted in which one integrated TSDF space (TSDF Volume) having the signed distance value F'(v) is generated, and the three-dimensional shape is restored on the basis of the one integrated TSDF space (TSDF Volume).

However, with
(A) the N pieces of TSDF space (TSDF Volume) generated by the TSDF space (TSDF Volume) generation units 111-1 to N, and
(B) the TSDF space (TSDF Volume) generated by the polygon mesh based TSDF space (TSDF Volume) generation unit 122,
an optimum synthesis ratio of these (A) and (B) is expected to vary depending on the subject.

A modified example described below has a configuration in which a user can input and change a weight coefficient, and has a configuration in which three-dimensional structure data generated in accordance with a setting value of the user is displayed on a display unit.

The user can perform such a process of: observing three-dimensional structure data according to various synthesis ratios displayed on the display unit; selecting optimum three-dimensional structure data; determining, as an optimum value, a synthesis ratio at a point of time when the display data is displayed; and storing, for example, the three-dimensional structure data in a storage unit together with the value of the synthesis ratio.

Figure 17:
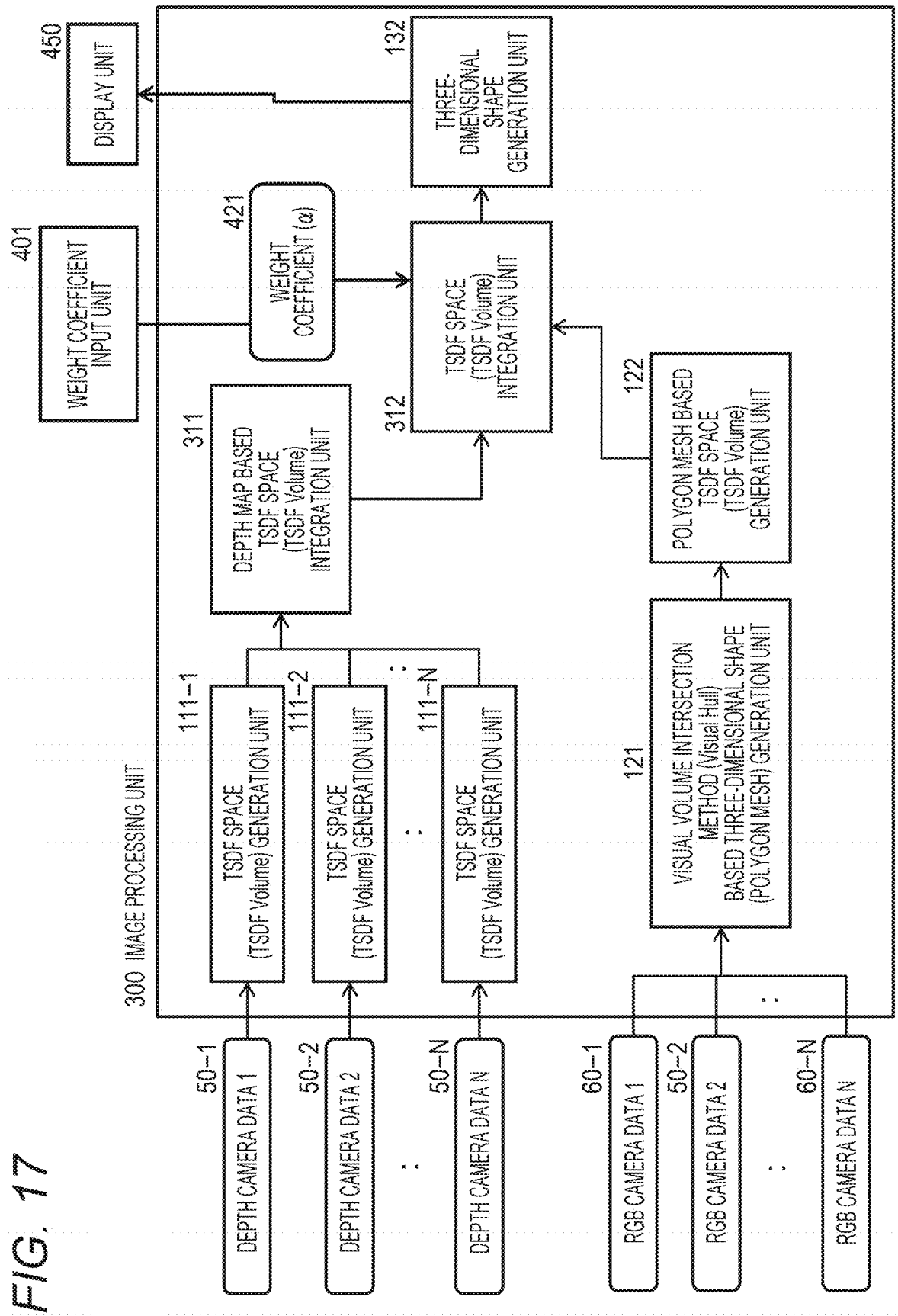
FIG. 17 is a diagram for explaining a configuration example of an image processing apparatus according to an embodiment having a configuration in which a user can input and change a weight coefficient.

FIG. 17 illustrates a configuration example of the image processing apparatus of the present embodiment.

FIG. 17 illustrates a configuration in which an internal configuration of the image processing unit 100 described above with reference to FIG. 5 is partially changed, and a weight coefficient input unit 401 and a display unit 450 are further added.

The internal configuration of the image processing unit 100 is changed as follows.

(1) Addition of a depth map based TSDF space (TSDF Volume) integration unit 311.

(2) A change of the TSDF space (TSDF Volume) integration unit 312 to have a configuration of inputting:
one depth map based TSDF space (TSDF Volume) generated by the depth map based TSDF space (TSDF Volume) integration unit 311; and a TSDF space (TSDF Volume) generated by the polygon mesh based TSDF space (TSDF Volume) generation unit 122.

(3) A point where a weight coefficient α 421 inputted by the user from the weight coefficient input unit 401 can be inputted to the TSDF space (TSDF Volume) integration unit 312.

(4) A point where a configuration is adopted in which three-dimensional structure data of the subject generated by the three-dimensional shape generation unit 132 is outputted to the display unit 450.

First, the depth map based TSDF space (TSDF Volume) integration unit 311 executes integration processing on the N pieces of TSDF space (TSDF Volume) generated by the TSDF space (TSDF Volume) generation units 111-1 to N, and generates one depth map based TSDF space (TSDF Volume).

The generation processing of the one depth map based TSDF space (TSDF Volume) can be executed by processing similar to the integration processing executed in the TSDF space (TSDF Volume) integration unit 131 described above in the embodiment having the configuration illustrated in FIG. 5.

That is, the one depth map based TSDF space (TSDF Volume) in which one signed distance value F(v) (TSDF value) is set for each voxel is generated by weighting addition based on a reliability value of the signed distance value F(v) (TSDF value) of each corresponding voxel.

However, here, only the depth map based TSDF space (TSDF Volume) is to be the integration processing target.

As described above, the depth map based TSDF space (TSDF Volume) integration unit 311 executes integration processing on the N pieces of TSDF space (TSDF Volume) generated by the TSDF space (TSDF Volume) generation units 111-1 to N, and generates the one depth map based TSDF space (TSDF Volume).

The generated one depth map based TSDF space (TSDF Volume) is inputted to the TSDF space (TSDF Volume) integration unit 312.

The TSDF space (TSDF Volume) integration unit 312 inputs the following two TSDF spaces (TSDF Volumes):
(A) the one depth map based TSDF space (TSDF Volume) generated by the depth map based TSDF space (TSDF Volume) integration unit 311; and (B) the TSDF space (TSDF Volume) generated by the polygon mesh based TSDF space (TSDF Volume) generation unit 122, and synthesizes these two TSDF spaces (TSDF Volumes).

The weight coefficient (a) corresponding to a synthesis ratio of the two TSDF spaces (TSDF Volumes) is inputted by the user via the weight coefficient input unit 401, and can be changed at any time.

As illustrated in FIG. 17, the user can input the weight coefficient (a) 421 to the TSDF space (TSDF Volume) integration unit 312 via the weight coefficient input unit 401.

In accordance with the weight coefficient (a) 421 inputted by the user, the TSDF space (TSDF Volume) integration unit 312 executes synthesis processing of the following two TSDF spaces (TSDF Volumes):

(A) the one depth map based TSDF space (TSDF Volume) generated by the depth map based TSDF space (TSDF Volume) integration unit 311; and (B) the TSDF space (TSDF Volume) generated by the polygon mesh based TSDF space (TSDF Volume) generation unit 122, to generate one integrated TSDF space (TSDF Volume).

Specifically, for example, the signed distance value F'(v) to be stored in each voxel of the integrated TSDF space (TSDF Volume) is calculated in accordance with (Equation 2) shown below.

[Formula 2]

$$F'(v) = \alpha F_{visualHull}(v) + (1-\alpha) F_{Depth}(v) \quad \text{(EQUATION 2)}$$

Note that, in (Equation 2) described above, $F_{visualHull}(V)$ is a signed distance value stored in a voxel of the TSDF space (TSDF Volume) generated by the polygon mesh based TSDF space (TSDF Volume) generation unit 122, $F_{Depth}(v)$ is a signed distance value stored in a voxel of the one depth map based TSDF space (TSDF Volume) generated by the depth map based TSDF space (TSDF Volume) integration unit 311, and a is the weight coefficient α and corresponds to a ratio of a polygon mesh-based TSDF space (TSDF Volume) included in the one integrated TSDF space (TSDF Volume) generated by the TSDF space (TSDF Volume) integration unit 312.

The one integrated TSDF space (TSDF Volume) generated by the TSDF space (TSDF Volume) integration unit 312 is inputted to the three-dimensional shape generation unit 132.

The three-dimensional shape generation unit 132 generates three-dimensional structure data of the subject on the basis of the one integrated TSDF space (TSDF Volume) generated by the TSDF space (TSDF Volume) integration unit 312, and outputs and displays the generated three-dimensional structure data of the subject on the display unit 450.

The user can change the weight coefficient (α) while observing the three-dimensional structure data of the subject displayed on the display unit 450, and can stop the change of the weight coefficient (α) at a time when the high-quality three-dimensional structure data is displayed, and store the three-dimensional structure data in a storage unit together with the weight coefficient (α).

Figure 18C:
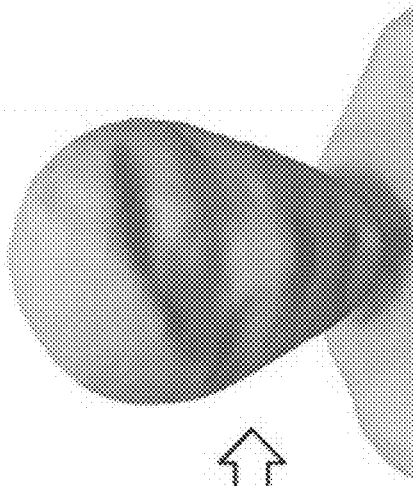
FIGS. 18A, 18B, and 18C are views for explaining a specific example of three-dimensional structure data displayed on a display unit in accordance with a change in a weight coefficient ($\alpha$).
Figure 18B:
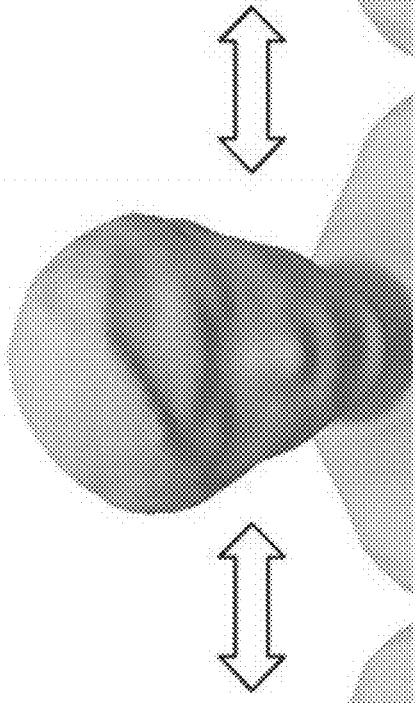
Figure 18A:
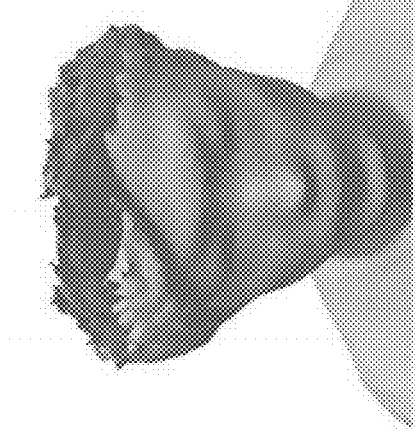

FIGS. 18A, 18B, and 18C illustrate a specific example of the three-dimensional structure data displayed on the display unit 450 in accordance with the change of the weight coefficient (α).

FIGS. 18A, 18B, and 18C illustrate an example of these three types of display data of:

FIG. 18A three-dimensional structure data with setting of the weight coefficient α=0.0, FIG. 18B three-dimensional structure data with setting of the weight coefficient α=0.5, and FIG. 18C three-dimensional structure data with setting of the weight coefficient α=1.0.

Note that the weight coefficient α corresponds to a ratio of a polygon mesh-based TSDF space (TSDF Volume) included in the one integrated TSDF space (TSDF Volume) generated by the TSDF space (TSDF Volume) integration unit 312.

The FIG. 18A three-dimensional structure data with setting of the weight coefficient α=0.0 is three-dimensional structure data generated only on the basis of the depth map based TSDF space (TSDF Volume).

The FIG. 18C three-dimensional structure data with setting of the weight coefficient α=1.0 is three-dimensional structure data generated only on the basis of the polygon mesh-based TSDF space (TSDF Volume) based on the RGB image.

The FIG. 18B three-dimensional structure data with setting of the weight coefficient α=0.5 is three-dimensional structure data generated only on the basis of a TSDF space (TSDF Volume) generated with a synthesis ratio of 1:1 between the depth map based TSDF space (TSDF Volume) and the polygon mesh-based TSDF space (TSDF Volume) based on the RGB image.

In this way, the user can perform such a process of: observing the three-dimensional structure data corresponding to various values of the weight coefficient α displayed on the display unit 450; selecting optimum three-dimensional structure data; determining, as an optimum value, the weight coefficient α at a point of time when the display data is displayed; and storing, for example, the three-dimensional structure data in a storage unit together with the value of the weight coefficient (α).

6. About Hardware Configuration Example of Image Processing Apparatus

Next, a hardware configuration example of the image processing apparatus of the present disclosure will be described with reference to FIG. 19.

For example, specifically, the image processing apparatus of the present disclosure can be configured by an information processing apparatus such as a personal computer (PC).

Figure 19:
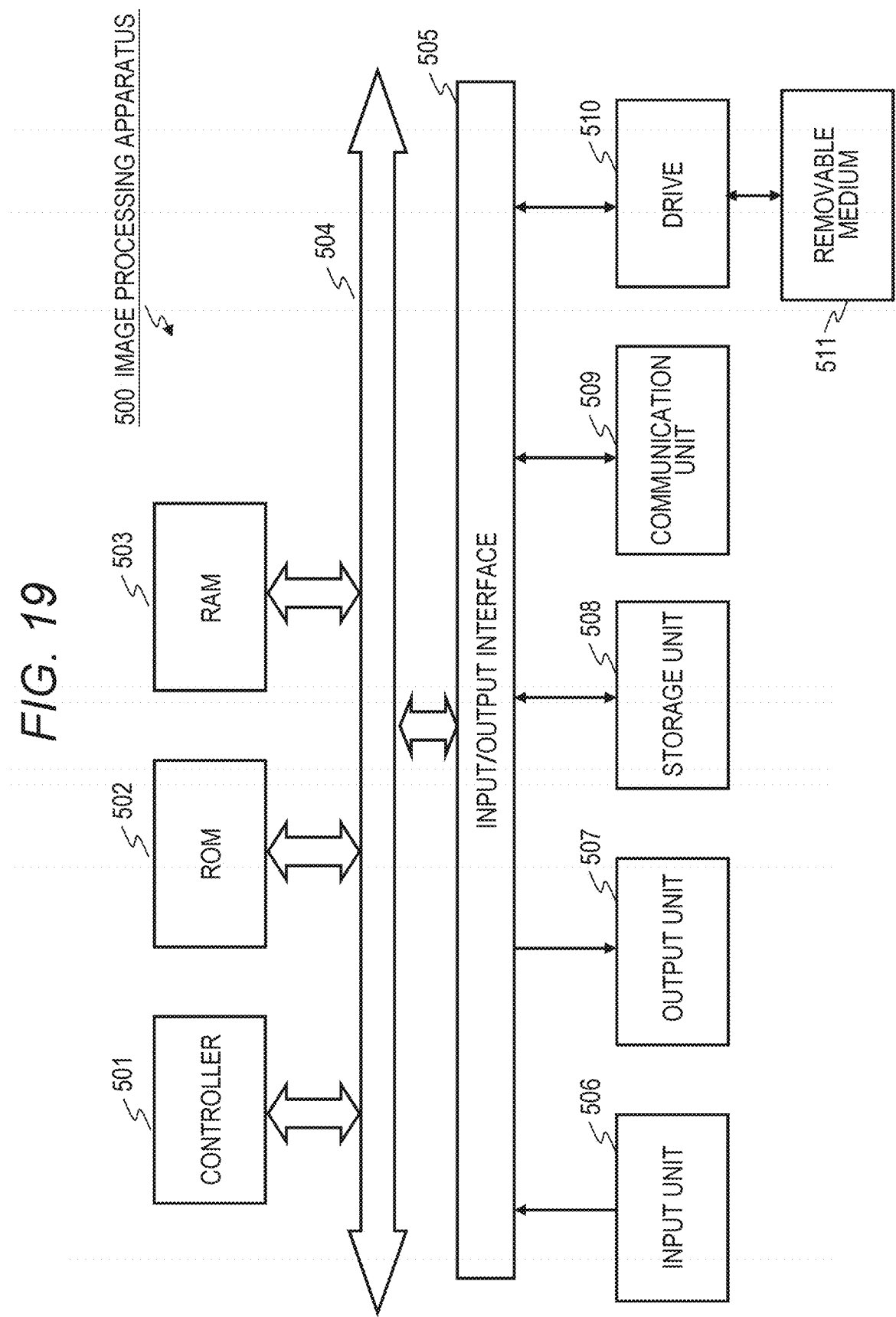

As illustrated in FIG. 19, an image processing apparatus 500 includes a controller 501, a read only memory (ROM) 502, a random access memory (RAM) 503, an input/output interface 505, and a bus 504 that connects these components to each other.

The controller 501 appropriately accesses the RAM 503 and the like as necessary, and integrally controls each of the entire blocks of the image processing apparatus 500 while performing various kinds of arithmetic processing. The controller 501 may be a central processing unit (CPU), a graphics processing unit (GPU), or the like. The ROM 502 is a nonvolatile memory that fixedly stores firmware to be executed by the CPU 501, such as an OS, programs, and various parameters. The RAM 503 is used as a work region or the like of the CPU 501, and temporarily holds the OS, various applications being executed, and various data being processed.

To the input/output interface 505, an input unit 506, an output unit 507, a storage unit 508, a communication unit 509, a drive 510 to which a removable medium 511 can be attached, and the like are connected.

Note that the input/output interface 505 may be configured to be connectable to an external peripheral device via a universal serial bus (USB) terminal, an IEEE terminal, or the like, in addition to these individual elements.

The input unit 506 is, for example, an input unit that can input a captured image (RGB image, depth map) of the RGB-D camera 10 illustrated in FIG. 1, and can further input user's operation information and the like. A configuration may be adopted in which the input unit 506 includes an imaging unit.

The input unit 506 also includes, for example, a pointing device such as a mouse, a keyboard, a touch panel, and other input devices.

The output unit 507 outputs data such as an image and sound. A configuration may be adopted in which the output unit 507 includes a display unit.

The storage unit 508 is, for example, a nonvolatile memory such as a hard disk drive (HDD), a flash memory (solid state drive; SSD), or other solid state memory. The storage unit 508 stores an OS, various applications, and various data. The storage unit 508 is also used as a storage region for an input image, image information, a generated output image group, and the like.

The communication unit 509 is, for example, a network interface card (NIC) for Ethernet (registered trademark), and is responsible for communication processing via a network.

The drive 510 is used for data recording and reproduction processing using the removable medium 511.

The removable medium 511 includes, for example, a BD, a DVD, a CD, an HDD, a flash memory, or the like.

7. Summary of Configuration of Present Disclosure

The embodiment of the present disclosure has been described in detail with reference to the specific embodiment. However, it is obvious that those skilled in the art can make modifications and substitutions of the embodiment without departing from the scope of the present disclosure. In other words, the present invention has been disclosed in the form of exemplification, and should not be construed as limiting. In order to determine the scope of the present disclosure, the section of the claims should be taken into consideration.

Note that the technology disclosed in this specification can have the following configurations.

(1) An image processing apparatus including:
an image processing unit configured to input captured images of a depth camera and a visible light camera, to analyze a three-dimensional shape of a subject, in which
the image processing unit
generates a depth map based TSDF space (TSDF Volume) by using a depth map acquired from a captured image of the depth camera,
generates a visible light image based TSDF space by using a captured image of the visible light camera,
generates an integrated TSDF space by integration processing on the depth map based TSDF space and the visible light image based TSDF space, and
executes three-dimensional shape analysis processing on the subject by using the integrated TSDF space.

(2) The image processing apparatus according to (1), in which
the image processing unit
generates a three-dimensional shape (polygon mesh) of the subject from a captured image of the visible light camera by applying a visual volume intersection method (Visual Hull), and generates the visible light image based TSDF space by using the generated three-dimensional shape (polygon mesh).

(3) The image processing apparatus according to (2), in which
the image processing unit
detects an intersection region of a plurality of silhouettes acquired from a plurality of visible light camera-captured images obtained by capturing images of the subject from a plurality of different directions, to generate a three-dimensional shape (polygon mesh) of the subject.

(4) The image processing apparatus according to any one of (1) to (3), in which
the image processing unit
generates a plurality of depth map based TSDF spaces by using a plurality of depth maps acquired from captured images obtained by capturing images of the subject with the depth camera from a plurality of different directions, and
generates the integrated TSDF space by integration processing on the plurality of depth map based TSDF spaces and the visible light image based TSDF space.

(5) The image processing apparatus according to any one of (1) to (4), in which
the image processing unit
generates a TSDF space in which a signed distance value $F(v)$ (TSDF value) including distance information between the subject and a voxel is stored in a voxel constituting each TSDF space of the depth map based TSDF space and the visible light image based TSDF space.

(6) The image processing apparatus according to (5), in which
the image processing unit
stores, in a voxel of the integrated TSDF space, a value calculated by executing weighting addition of a signed distance value $F(v)$ (TSDF value) in a voxel of each of the depth map based TSDF space and the visible light image based TSDF space.

(7) The image processing apparatus according to (6), in which
the image processing unit applies,
as a weight value to be applied to the weighting addition, a reliability value recorded in association with a signed distance value $F(v)$ (TSDF value) in a voxel of the depth map based TSDF space.

(8) The image processing apparatus according to (7), in which
the depth camera is configured to perform depth map generation processing using infrared light, and
the reliability value is a value corresponding to a pixel value of a captured image of the depth camera.

(9) The image processing apparatus according to any one of (1) to (8), in which
the image processing unit
inputs subject images from different directions captured by a plurality of cameras arranged around the subject, and executes three-dimensional shape analysis processing on the subject.

(10) The image processing apparatus according to any one of (1) to (8), in which
the image processing unit
inputs subject images from different directions captured by a camera that moves around the subject, and executes three-dimensional shape analysis processing on the subject.

(11) The image processing apparatus according to any one of (1) to (8), in which
the image processing unit
inputs subject images from different directions captured by a fixed camera that captures an image of the subject that rotationally moves, and executes three-dimensional shape analysis processing on the subject.

(12) The image processing apparatus according to any one of (1) to (11), further including:
an input unit configured to input a weight coefficient to be applied to integration processing on the depth map based TSDF space and the visible light image based TSDF space, in which
the image processing unit
integrates the depth map based TSDF space and the visible light image based TSDF space to generate the integrated TSDF space, in accordance with a weight coefficient inputted via the input unit.

(13) The image processing apparatus according to (12), further including:
a display unit configured to display three-dimensional structure data of the subject generated by the image processing unit, in which
the image processing unit
displays, on the display unit, three-dimensional structure data changed in accordance with the weight coefficient inputted via the input unit.

(14) An image processing method executed in an image processing apparatus, in which
the image processing apparatus includes:
an image processing unit configured to input captured images of a depth camera and a visible light camera, to analyze a three-dimensional shape of a subject, and
the image processing unit
generates a depth map based TSDF space (TSDF Volume) by using a depth map acquired from a captured image of the depth camera,
generates a visible light image based TSDF space by using a captured image of the visible light camera,
generates an integrated TSDF space by integration processing on the depth map based TSDF space and the visible light image based TSDF space, and
executes three-dimensional shape analysis processing on the subject by using the integrated TSDF space.

(15) A program for causing an image processing apparatus to execute image processing, in which
the image processing apparatus includes:
an image processing unit configured to input captured images of a depth camera and a visible light camera, to analyze a three-dimensional shape of a subject, and
the program causes the image processing unit to execute:
a process of generating a depth map based TSDF space (TSDF Volume) by using a depth map acquired from a captured image of the depth camera;
a process of generating a visible light image based TSDF space by using a captured image of the visible light camera;
a process of generating an integrated TSDF space by integration processing on the depth map based TSDF space and the visible light image based TSDF space; and
a process of executing three-dimensional shape analysis processing on the subject by using the integrated TSDF space.

Note that, the series of processes described in the specification can be executed by hardware, software, or a combined configuration of both. In a case of executing processing by software, a program recording a processing sequence can be installed and executed in a memory in a computer incorporated in dedicated hardware, or a program can be installed and executed in a general-purpose computer capable of executing various processes. For example, the program can be recorded in advance on a recording medium. The program can be installed from a recording medium to a computer, or can be received via a network such as a local area network (LAN) or the Internet, and installed in a recording medium such as an incorporated hard disk.

Furthermore, the various processes described in the specification may be executed not only in a chronological order in accordance with the description, but may also be executed in parallel or individually depending on processing capability of a device that executes the processing or depending on the necessity. Furthermore, a system in this specification is a logical set configuration of a plurality of devices, and is not limited to one in which a device of each configuration is in a same casing.

INDUSTRIAL APPLICABILITY

As described above, according to a configuration of one embodiment of the present disclosure, a configuration is realized in which captured images of the depth camera and the visible light camera are inputted, and a highly accurate three-dimensional shape of a subject is analyzed and restored.

Specifically, for example, there is provided an image processing unit that inputs captured images of the depth camera and the visible light camera to analyze a three-dimensional shape of a subject. The image processing unit generates a depth map based TSDF space (TSDF Volume) by using a depth map acquired from a captured image of the depth camera, and generates a visible light image based TSDF space by using a captured image of the visible light camera. Moreover, an integrated TSDF space is generated by integration processing on the depth map based TSDF space and the visible light image based TSDF space, and three-dimensional shape analysis processing on the subject is executed using the integrated TSDF space.

This configuration realizes a configuration in which captured images of the depth camera and the visible light camera are inputted and a highly accurate three-dimensional shape of a subject is analyzed and restored.

REFERENCE SIGNS LIST

1 Subject
10 RGB-D camera
20 Image processing apparatus
50 Input unit
100 Image processing unit
111 TSDF space (TSDF Volume) generation unit
121 Visual volume intersection method (Visual Hull) based three-dimensional shape (polygon mesh) generation unit
122 Polygon mesh based TSDF space (TSDF Volume) generation unit
131 TSDF space (TSDF Volume) integration unit
132 Three-dimensional shape generation unit
300 Image processing unit
311 Depth map based TSDF space (TSDF Volume) integration unit
312 TSDF space (TSDF Volume) integration unit
401 Weight coefficient input unit
450 Display unit 500 Image processing apparatus
501 Controller
502 ROM
503 RAM
504 Bus
505 Input/output interface
506 Input unit
507 Output unit
508 Storage unit
509 Communication unit
510 Drive
511 Removable medium

The invention claimed is:

1. An image processing apparatus, comprising:
circuitry configured to:
  acquire a depth map based on a captured image of a depth camera;
  generate, based on the depth map, a depth-map-based TSDF space (TSDF Volume);
  determine, based on a reliability value, a low-reliability depth region and a high-reliability depth region of the depth-map-based TSDF space, wherein
    the reliability value corresponds to a pixel value associated with each pixel unit of the captured image of the depth camera, and
    the reliability value of the low-reliability depth region is lower than the reliability value of the high-reliability depth region;
  acquire a visible light image from a visible light camera;
  partially generate, based on the determination of the low-reliability depth region and the high-reliability depth region, a visible-light-image-based TSDF space for the low-reliability depth region by a visual volume intersection method (Visual Hull);
  generate an integrated TSDF space by integration of the depth-map-based TSDF space and the visible-light-image-based TSDF space corresponding to the low-reliability depth region; and
  analyze a three-dimensional shape of a subject in the integrated TSDF space.

2. The image processing apparatus according to claim 1, wherein the circuitry is further configured to:
  generate a three-dimensional (polygon mesh of the subject from the visible light image of the visible light camera by the visual volume intersection method (Visual Hull); and
  generate, based on the generated three-dimensional polygon mesh, the visible-light-image-based TSDF space.

3. The image processing apparatus according to claim 2, wherein circuitry is further configured to:
  acquire a plurality of silhouettes from a plurality of visible light images of the subject captured from a plurality of directions;
  detect an intersection region of the plurality of silhouettes; and
  generate the three-dimensional polygon mesh of the subject.

4. The image processing apparatus according to claim 1, wherein the circuitry is further configured to:
  acquire a plurality of depth maps associated with a plurality of captured images of the subject, wherein the plurality of captured images is captured by the depth camera at a plurality of directions;
  generate, based on the plurality of depth maps, a plurality of depth-maps-based TSDF spaces; and
  generate the integrated TSDF space by integration of plurality of depth-maps-based TSDF spaces and the visible-light-image-based TSDF space.

5. The image processing apparatus according to claim 1, wherein
  the circuitry is further configured to store, in each voxel constituting each of the depth-map-based TSDF space and the visible-light-image-based TSDF space, a signed distance value $F(v)$ (TSDF value), and
  the signed distance value $F(v)$ including distance information between the subject and a voxel.

6. The image processing apparatus according to claim 5, wherein the circuitry is further configured to:
  store, in a voxel of the integrated TSDF space, a value calculated by weighting addition of the signed distance value $F(v)$ (TSDF value) in a corresponding voxel of each of the depth-map-based TSDF space and the visible-light-image-based TSDF space.

7. The image processing apparatus according to claim 6, wherein the circuitry is further configured to:
  apply a weight value for the weighting addition; and
  apply the reliability value in association with the signed distance value $F(v)$ (TSDF value) in each voxel of the depth-map-based TSDF space.

8. The image processing apparatus according to claim 7, wherein the depth camera is configured to perform depth map generation using infrared light.

9. The image processing apparatus according to claim 1, wherein the circuitry is further configured to:
  acquire subject images captured from different directions by a plurality of cameras around the subject, wherein the plurality of cameras includes a plurality of depth cameras and a plurality of visible light cameras; and
  analyze the three-dimensional shape of the subject.

10. The image processing apparatus according to claim 1, wherein the circuitry is further configured to:
  acquire subject images captured from different directions by a camera that moves around the subject, wherein the camera includes the depth camera and the visible light camera; and
  analyze the three-dimensional shape of the subject.

11. The image processing apparatus according to claim 1, wherein the circuitry is further configured to:
  acquire subject images captured from different directions by a fixed camera that captures an image while the subject rotationally moves, wherein the fixed camera includes the depth camera and the visible light camera; and
  analyze the three-dimensional shape of the subject.

12. The image processing apparatus according to claim 1, wherein the circuitry is further configured to:
  acquire a weight coefficient for the integration of the depth-map-based TSDF space and the visible-light-image-based TSDF space; and
  integrate, based on the acquired weight coefficient, the depth-map-based TSDF space and the visible-light-image-based TSDF space to generate the integrated TSDF space.

13. The image processing apparatus according to claim 12, further comprising:
  the circuitry further configured to generate, based on the analysis of the three-dimensional shape of the subject, three-dimensional structure data of the subject,
  a display unit configured to display the three-dimensional structure data of the subjects, the circuitry further configured to modify, based on the acquired weight coefficient, the three-dimensional structure data of the subject, and the display unit further configured to display the modified three-dimensional structure data.

14. An image processing method, comprising:

in an image processing apparatus acquiring a depth map based on a captured image of a depth camera;

generating, based on the depth map, a depth-map-based TSDF space (TSDF Volume);

determining, based on a reliability value, a low-reliability depth region and a high-reliability depth region of the depth-map-based TSDF space, wherein the reliability value corresponds to a pixel value associated with each pixel unit of the captured image of the depth camera, and the reliability value of the low-reliability depth region is lower than the reliability value of the high-reliability depth region;

acquiring a visible light image from a visible light camera;

partially generating, based on the determination of the low-reliability depth region and the high-reliability depth region, a visible-light-image-based TSDF space for the low-reliability depth region by a visual volume intersection method (Visual Hull);

generating an integrated TSDF space by integration of the depth-map-based TSDF space and the visible-light-image-based TSDF space corresponding to the low-reliability depth region; and analyzing a three-dimensional shape of a subject in the integrated TSDF space.

15. A non-transitory computer-readable medium having stored thereon, computer-executable instructions which, when executed by a computer, cause the computer to execute operations, the operations comprising:

acquiring a depth map based on a captured image of a depth camera;

generating, based on the depth map a depth-map-based TSDF space (TSDF Volume);

determining, based on a reliability value, a low-reliability depth region and a high-reliability depth region of the depth-map-based TSDF space, wherein the reliability value corresponds to a pixel value associated with each pixel unit of the captured image of the depth camera, and the reliability value of the low-reliability depth region is lower than the reliability value of the high-reliability depth region;

acquiring a visible light image from a visible light camera;

partially generating, based on the determination of the low-reliability depth region and the high-reliability depth region, a visible-light-image-based TSDF space for the low-reliability depth region by a visual volume intersection method (Visual Hull);

generating an integrated TSDF space by integration of the depth-map-based TSDF space and the visible-light-image-based TSDF space corresponding to the low-reliability depth region; and analyzing a three-dimensional shape of a subject in the integrated TSDF space.

\* \* \* \* \*